US 8,914,206 B2

(12) United States Patent
Hattori et al.

(10) Patent No.: US 8,914,206 B2
(45) Date of Patent: Dec. 16, 2014

(54) CONTROL DEVICE OF CONTINUOUSLY VARIABLE TRANSMISSION FOR VEHICLE

(75) Inventors: Kunio Hattori, Nagoya (JP); Shinya Toyoda, Nisshin (JP); Atsushi Ayabe, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 135 days.

(21) Appl. No.: 13/819,551

(22) PCT Filed: Aug. 27, 2010

(86) PCT No.: PCT/JP2010/064642
§ 371 (c)(1),
(2), (4) Date: Feb. 27, 2013

(87) PCT Pub. No.: WO2012/026043
PCT Pub. Date: Mar. 1, 2012

(65) Prior Publication Data
US 2013/0165282 A1  Jun. 27, 2013

(51) Int. Cl.
*F16H 61/02* (2006.01)
*F16H 9/12* (2006.01)

(52) U.S. Cl.
CPC ............... *F16H 61/02* (2013.01); *F16H 9/125* (2013.01)
USPC ............................................. 701/51; 701/61

(58) Field of Classification Search
USPC .............................. 701/51, 61; 474/12, 17, 28
See application file for complete search history.

(56) References Cited

U.S. PATENT DOCUMENTS 5,720,692 A   2/1998  Kashiwabara
6,135,915 A  10/2000  Aoki et al.

(Continued)

FOREIGN PATENT DOCUMENTS

JP    8 285021    11/1996
JP   2000 97321    4/2000

(Continued)

OTHER PUBLICATIONS

Hattori, K., et al., "Development of Ratio Control System for Toyota's New Continuously Variabl Transmission," SAE International, pp. 144-151, (Apr. 8, 2013).
International Search Report Issued Nov. 30, 2010 in PCT/JP10/064642 Filed Aug. 27, 2010.

*Primary Examiner* — Edwin A Young
(74) *Attorney, Agent, or Firm* — Oblon, Spivak, McClelland, Maier & Neustadt, L.L.P.

(57) ABSTRACT

A control device of a continuously variable transmission for a vehicle having a pair of variable pulleys with variable effective diameters of an input-side variable pulley and an output-side variable pulley and a transmission belt wound around between the pair of the variable pulleys, the continuously variable transmission respectively controlling an input-side thrust force in the input-side variable pulley and an output-side thrust force in the output-side variable pulley to set an actual gear ratio to a target gear ratio while preventing a slip of the transmission belt, the continuously variable transmission includes: a hydraulic control circuit capable of accurately controlling one of the input-side variable pulley and the output-side variable pulley in terms of thrust force as compared to the other, in the case that a target thrust force on the one side for assuring belt slip prevention of the both pulleys on the one side is set, based on a target thrust force on the one side, a target thrust force on the other side for achieving a target gear ratio on the other side being set, and a larger one being selected as the target thrust force on the one side out of a limit thrust force to a slip on the one side required for belt slip prevention on the one side, and a thrust force on the one side required for achieving a target gear ratio on the one side calculated based on a limit thrust force to a slip on the other side required for belt slip prevention on the other side.

17 Claims, 11 Drawing Sheets

(56) References Cited

U.S. PATENT DOCUMENTS

| | | |
|---|---|---|
| 7,387,589 B2 * | 6/2008 | Suzuki et al. .................. 477/46 |
| 7,957,872 B2 * | 6/2011 | Tanaka et al. .................. 701/61 |
| 2003/0135315 A1 * | 7/2003 | Watanabe et al. ............... 701/51 |
| 2007/0117664 A1 * | 5/2007 | Shioiri et al. .................. 474/28 |

FOREIGN PATENT DOCUMENTS

| | | |
|---|---|---|
| JP | 3042684 | 5/2000 |
| JP | 2001 173770 | 6/2001 |

* cited by examiner

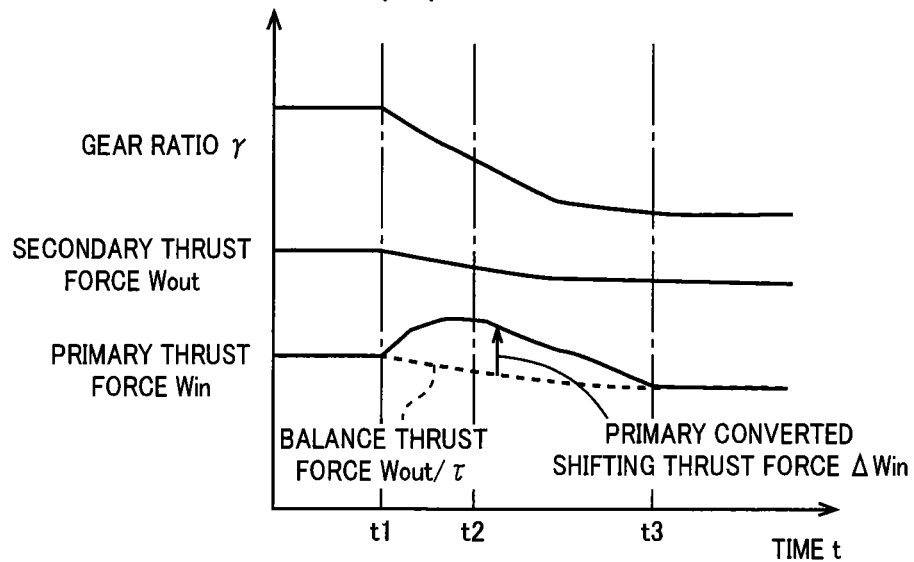
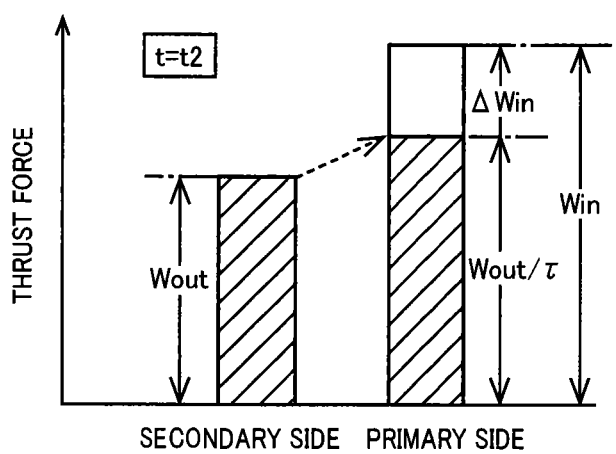

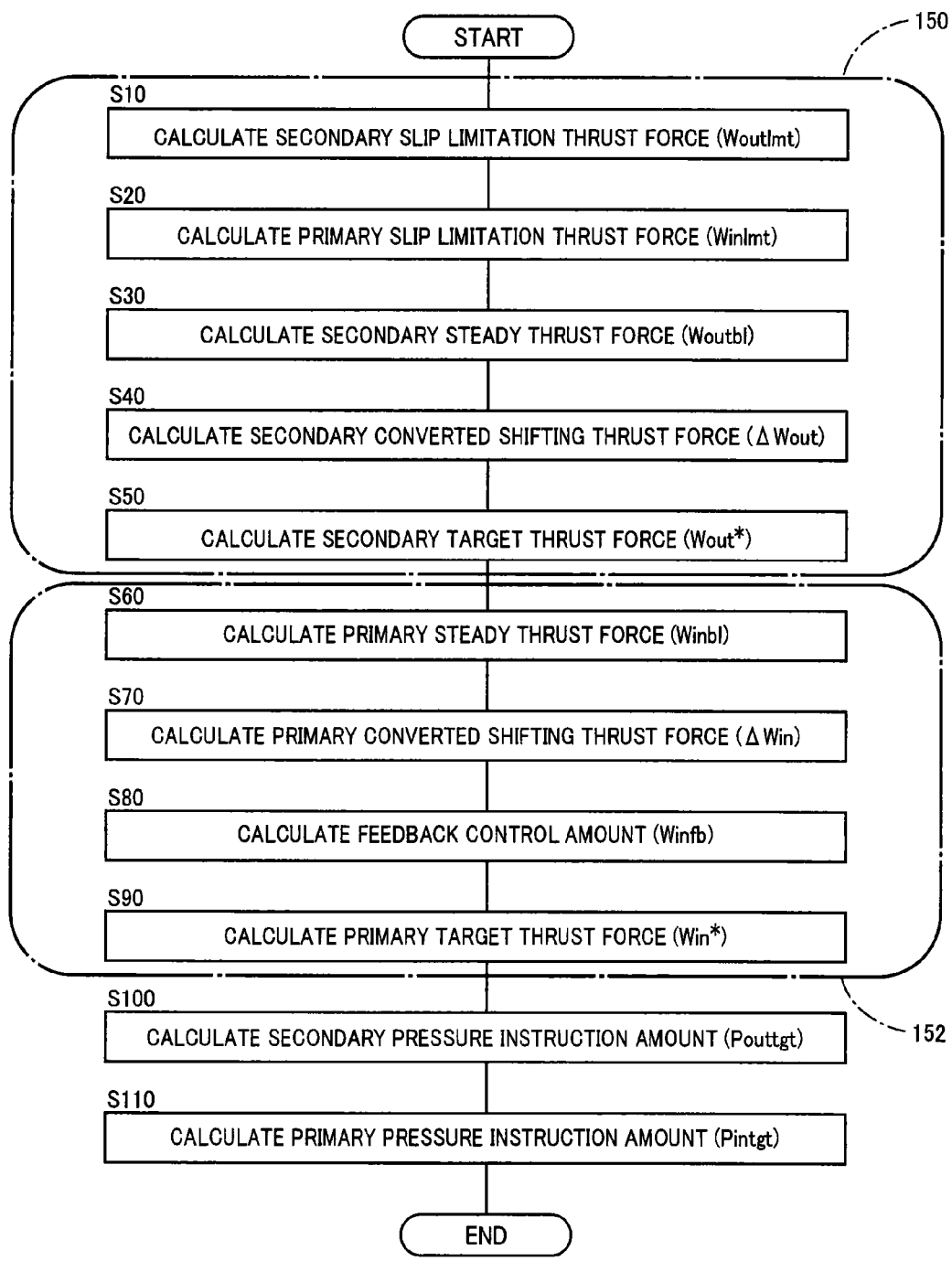

CONTROL DEVICE OF CONTINUOUSLY VARIABLE TRANSMISSION FOR VEHICLE

TECHNICAL FIELD

The present invention relates to a control device of a continuously variable transmission for a vehicle (a belt type continuously variable transmission) respectively controlling an input-side thrust force and an output-side thrust force to achieve a target gear ratio while preventing a belt slip.

BACKGROUND ART

A control device of a continuously variable transmission for a vehicle (hereinafter, continuously variable transmission) is well known that has a pair of variable pulleys with variable effective diameters of an input-side variable pulley (a primary pulley, a primary sheave) and an output-side variable pulley (a secondary pulley, a secondary sheave) and a transmission belt wound around between the pair of the variable pulleys and that respectively controls an input-side thrust force (a primary thrust force) in the primary pulley and an output-side thrust force (a secondary thrust force) in the secondary pulley to set an actual gear ratio to a target gear ratio while preventing a slip of the transmission belt. This corresponds to a speed change control device for a belt type continuously variable transmission described in Patent Document 1. For such a continuously variable transmission, for example, a target thrust force on the secondary side (a target secondary thrust force) is set to a limit thrust force to a slip (a required secondary thrust force) which is a minimum required thrust force to prevent a belt slip from occurring in the secondary pulley. A target thrust force on the primary side (a target primary thrust force) is set to the sum (total thrust force) of a balance thrust force (steady thrust force) balanced with the target secondary thrust force based on a thrust force ratio (=secondary thrust force/primary thrust force) for maintaining the target gear ratio and a shifting thrust force (transient thrust force) for achieving a target shift speed when a gear ratio is changing. Oil pressures to each of the pulleys are controlled so as to acquire respective set thrust forces, thereby achieving the target gear ratio while preventing a belt slip from occurring.

For example, it is assumed that a downshift of the continuously variable transmission is performed. Since the shifting thrust force on the primary side is a negative value in the case of downshift, the target primary thrust force to be set easily falls below a limit thrust force to a slip (hereafter referred as a slip limitation thrust force) (a required primary thrust force) which is a minimum required thrust force to prevent a belt slip from occurring in the primary pulley and may cause a belt slip. Since the shifting thrust force on the primary side is a positive value in the case of upshift, the target primary thrust force to be set hardly falls below the required primary thrust force; however, the target primary thrust force may fall below the required primary thrust force and cause a belt slip depending on the balance thrust force on the primary side etc. With regard to such a target primary thrust force falling below the required primary thrust force, Patent Document 1 proposes that when the target primary thrust force is smaller than the required primary thrust force, the slip limitation thrust force is set as the target primary thrust force on the primary side while the total thrust force of the balance thrust force for shifting and the shifting thrust force is set as the target secondary thrust force on the secondary side, thereby achieving an intended shift while preventing a belt slip from occurring by using a minimum required pulley thrust force. Therefore, in Patent Document 1, it is determined whether the target primary thrust force for shift control corresponding to the target secondary thrust force set to the slip limitation thrust force (required secondary thrust force) is smaller than the slip limitation thrust force (required primary thrust force) and a function of assuring the belt slip prevention and a function of achieving an intended shift are interchanged between the primary side and the secondary side based on the determination result, thereby achieving the shift and the belt slip prevention with a minimum thrust force.

PRIOR ART DOCUMENT

Patent Document

Patent Document 1: Japanese Patent Publication No. 3042684

SUMMARY OF THE INVENTION

Problem to be Solved by the Invention

One pulley side with the belt slip prevention assured is based on the premise that hydraulic control accuracy is high on the one pulley side, for example. Considering that an actual oil pressure has oil pressure variation relative to an oil pressure command value, when an actual thrust force is adjusted to a target thrust force set to the slip limitation thrust force, for example, it is desired to include an oil pressure sensor detecting the actual oil pressure to the one pulley side to enable feedback control such that a detection value of the oil pressure sensor matches a target oil pressure to the one pulley side corresponding to the target thrust force. The other pulley side achieving an intended shift may not necessarily be based on the premise that the hydraulic control accuracy is high on the other pulley side since the thrust force on the other pulley side can be corrected through feedback control such that an actual gear ratio matches a target gear ratio.

As a result, the technique proposed in Patent Document 1 causes no problem when a function of assuring the belt slip prevention and a function of achieving an intended shift are interchanged if the hydraulic control accuracy is high on both the primary side and the secondary side, for example, if respective oil pressure sensors are disposed for detecting respective pulley pressures of the both pulleys. However, improving the hydraulic control accuracy on both the primary side and the secondary side leads to a cost increase. If the hydraulic control accuracy is improved on only one pulley side for a cost reduction, the hydraulic control accuracy on the other pulley side is lower than that of the one pulley side and, therefore, for example, the following problem occurs. For example, in the case of a hardware configuration having the oil pressure sensor included only on the one pulley side, for certainly assuring the belt slip prevention in a shift state in which a target thrust force on the other pulley side having lower hydraulic control accuracy is set to a slip limitation thrust force, the target thrust force must be set to, for example, "a slip limitation thrust force+a thrust force corresponding to predetermined oil pressure variation on the other pulley side for certainly achieving the slip limitation thrust force no matter how greatly the oil pressure varies". Therefore, when it is attempted to achieve a balance with the target thrust force on the other pulley side based on a thrust force ratio so as to achieve the intended shift, the target thrust force (or target oil pressure) on the one pulley side must also be increased in accordance with the "thrust force corresponding to oil pressure variation on the other pulley side" and fuel efficiency may deteriorate. The problem as described above is not known and no proposal has been made on suppression of deterioration of fuel efficiency due to oil pressure variation in the belt type continuously variable transmission with higher hydraulic control accuracy achieved only on one pulley side.

The present invention was conceived in view of the situations and it is therefore an object of the present invention to provide a control device of a continuously variable transmission for a vehicle capable of cutting an oil pressure margin on the pulley side with lower hydraulic control accuracy to achieve improvement in fuel efficiency.

Means for Solving the Problems

To achieve the object, the present invention provides (a) a control device of a continuously variable transmission for a vehicle having a pair of variable pulleys with variable effective diameters of an input-side variable pulley and an output-side variable pulley and a transmission belt wound around between the pair of the variable pulleys, the continuously variable transmission respectively controlling an input-side thrust force in the input-side variable pulley and an output-side thrust force in the output-side variable pulley to set an actual gear ratio to a target gear ratio while preventing a slip of the transmission belt, the continuously variable transmission comprising: (b) a hydraulic control circuit capable of accurately controlling one of the input-side variable pulley and the output-side variable pulley in terms of thrust force as compared to the other, (c) in the case that a target thrust force on the one side for assuring belt slip prevention of the both pulleys on the one side is set, based on a target thrust force on the one side, a target thrust force on the other side for achieving a target gear ratio on the other side being set, and (d) a larger one being selected as the target thrust force on the one side out of a limit thrust force to a slip on the one side required for belt slip prevention on the one side, and a thrust force on the one side required for achieving a target gear ratio on the one side calculated based on a limit thrust force to a slip on the other side required for belt slip prevention on the other side.

Consequently, since in the case that a target thrust force on the one side for assuring belt slip prevention of the both pulleys on the one side is set, based on a target thrust force on the one side, a target thrust force on the other side for achieving a target gear ratio on the other side being set, and a larger one being selected as the target thrust force on the one side out of a limit thrust force to a slip on the one side required for belt slip prevention on the one side, and a thrust force on the one side required for achieving a target gear ratio on the one side calculated based on a limit thrust force to a slip on the other side required for belt slip prevention on the other side, a required thrust force for the belt slip prevention in the one variable pulley is naturally ensured on the side of the one variable pulley with relatively higher thrust force control accuracy (hydraulic control accuracy) and a required thrust force for the belt slip prevention is also ensured in the other variable pulley with relatively lower thrust force control accuracy. Since the thrust force for the belt slip prevention is controlled on the side of the one variable pulley with relatively higher thrust force control accuracy, it is not necessary to add the oil pressure variation in the other variable pulley at the time of setting of the target thrust force. In other words, the required thrust forces for the belt slip prevention in the both variable pulleys are ensured without adding the oil pressure variation on the side of the one variable pulley. Therefore, improvement in fuel efficiency can be achieved by cutting an oil pressure margin on the side of the pulley with relatively lower hydraulic control accuracy.

An intended shift can be achieved while a belt slip in the other variable pulley is prevented without adding the oil pressure variation in the other variable pulley with relatively lower thrust force control accuracy.

Preferably, the target thrust force on the other side is corrected through feedback control of a thrust force on the other side based on a deviation between a target gear ratio and an actual gear ratio or a deviation between a target pulley position and an actual pulley position. Consequently, the oil pressure variation can be compensated in the other variable pulley with relatively lower thrust force control accuracy. Therefore, deterioration of fuel efficiency due to the oil pressure variation can be suppressed and the intended shift and the belt slip prevention can properly be implemented with a required minimum pulley thrust force.

Preferably, the thrust force required for the shift control is a thrust force required for achieving a target gear ratio and a target shift speed. Consequently, a thrust force required for the shift control is properly calculated.

Preferably, the limit thrust force to a slip is calculated based on an actual gear ratio and an input torque of the continuously variable transmission for a vehicle. Consequently, the slip limitation thrust force is properly calculated and a required thrust force for the belt slip prevention is properly ensured.

Preferably, the hydraulic control circuit includes an oil pressure sensor for detecting an actual pulley pressure acting on the one variable pulley only on the one side, and wherein feedback control is provided that sets a detection value of the oil pressure sensor to a target pulley pressure corresponding to the target thrust force on the one side. Consequently, a thrust force can accurately be controlled on the one side as compared to the other.

Preferably, a predetermined thrust force corresponding to variation related to calculation of the thrust force on the one side based on the limit thrust force to a slip on the other side is added before the calculation to the limit thrust force to a slip on the other side. Consequently, a required thrust force is properly ensured for certainly preventing a belt slip in the other variable pulley with relatively lower thrust force control accuracy. The variation related to the calculation is different from, for example, oil pressure variation (a gap of an actual oil pressure relative to an oil pressure command value), and is individual variations (unit variations) of predetermined characteristics, for example used when the thrust force on the one side is calculated based on the limit thrust force to a slip on the other side. Although the oil pressure variation may be a relatively large value in some units, for example, the variation related to the calculation is an extremely small value as compared to the oil pressure variation.

BRIEF DESCRIPTION OF THE DRAWINGS

FIG. 5 is a diagram of one example for explaining a thrust force required for the shift control.

FIG. 12 is a flowchart for explaining a main portion of the control operation of the electronic control device, i.e., the control operation for achieving fuel efficiency improvement by cutting an oil pressure margin on the side of the primary pulley with lower hydraulic control accuracy.

MODE FOR CARRYING OUT THE INVENTION

In the present invention, preferably, the input-side thrust force and the output-side thrust force are respectively directly or indirectly controlled by configuring a hydraulic control circuit such that the pulley pressures acting on the input-side variable pulley and the output-side variable pulley are controlled independently of each other.

An embodiment of the present invention will now be described in detail with reference to the drawings.

Embodiment

Figure 1:
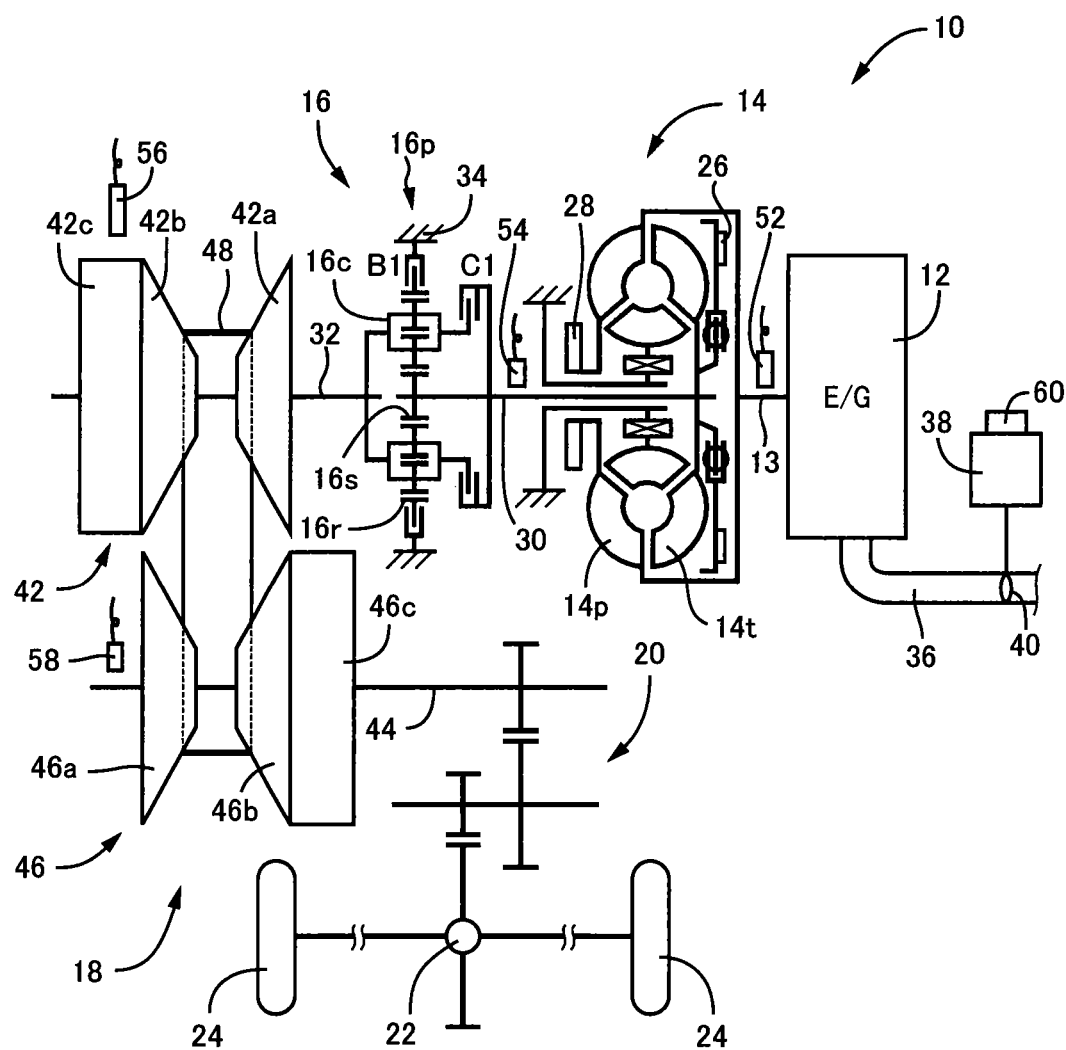
FIG. 1 is a diagram for explaining a general configuration of a power transmission path making up a vehicle to which the present invention is applied.

FIG. 1 is a diagram for explaining a general configuration of a power transmission path from an engine 12 to drive wheels 24 making up a vehicle 10 to which the present invention is applied. In FIG. 1, for example, the power generated by the engine 12 used as a drive force source for running is transmitted sequentially through a torque converter 14 acting as a hydraulic transmission device, a forward/reverse switching device 16, a belt type continuously variable transmission 18 (hereinafter referred to as a continuously variable transmission (CVT)) 18 acting as a continuously variable transmission for a vehicle, a reduction gear device 20, a differential gear device 22, etc., to the left and right drive wheels 24.

The torque converter 14 includes a pump impeller 14$p$ coupled to a crankshaft 13 of the engine 12 and a turbine impeller 14$t$ coupled to the forward/reverse switching device 16 via a turbine shaft 30 corresponding to an output-side member of the torque converter 14 to transmit power via fluid. A lockup clutch 26 is disposed between the pump impeller 14$p$ and the turbine impeller 14$t$, and the complete engagement of the lockup clutch 26 causes the pump impeller 14$p$ and the turbine impeller 14$t$ to integrally rotate. The pump impeller 14$p$ is coupled to a mechanical oil pump 28 rotationally driven by the engine 12 to generate an operating oil pressure for providing shift control to the continuously variable transmission 18, to generate a belt clamping pressure in the continuously variable transmission 18, to control a torque capacity of the lockup clutch 26, to switch a power transmission path in the forward/reverse switching device 16, and to supply lubricant oil to the portions of the power transmission path of the vehicle 10.

The forward/reverse switching device 16 is mainly made up of a forward clutch C1, a reverse brake B1, and a double pinion type planetary gear device 16$p$ with a sun gear 16$s$ integrally coupled to the turbine shaft 30 of the torque converter 14 and a carrier 16$c$ integrally coupled to an input shaft 32 of the continuously variable transmission 18 and, on the other hand, the carrier 16$c$ and the sun gear 16$s$ are selectively coupled via the forward clutch C1 while a ring gear 16$r$ is selectively fixed via the reverse brake B1 to a housing 34 acting as a non-rotating member. The forward clutch C1 and the reverse brake B1 correspond to an interrupting device and both are hydraulic friction engagement devices caused to be frictionally engaged by a hydraulic cylinder.

In the forward/reverse switching device 16 configured as above, when the forward clutch C1 is engaged and the reverse brake B1 is released, the forward/reverse switching device 16 is put into an integrally rotating state and the turbine shaft 30 is directly coupled to the input shaft 32 to establish (achieve) a forward power transmission path, thereby transmitting a drive force in the forward direction to the continuously variable transmission 18. When the reverse brake B1 is engaged and the forward clutch C1 is released, a reverse power transmission path is established (achieved) in the forward/reverse switching device 16 and the input shaft 32 is rotated in the reverse direction relative to the turbine shaft 30, thereby transmitting a drive force in the reverse direction to the continuously variable transmission 18. When both the forward clutch C1 and the reverse brake B1 are released, the forward/reverse switching device 16 is put into a neutral state (power transmission interrupted state) in which the power transmission is interrupted.

The engine 12 is made up of an internal-combustion engine such as a gasoline engine and a diesel engine, for example. An intake pipe 36 of the engine 12 is disposed with an electronic throttle valve 40 for electrically controlling an intake air quantity $Q_{AIR}$ of the engine 12 by using a throttle actuator 38.

The continuously variable transmission 18 includes a pair of variable pulleys 42 and 46 that are the input-side variable pulley (the primary pulley, the primary sheave) 42 having a variable effective diameter, i.e., an input-side member disposed on the input shaft 32, and the output-side variable pulley (the secondary pulley, the secondary sheave) 46 having a variable effective diameter, i.e., an output-side member disposed on an output shaft 44, and a transmission belt 48 wound around between the pair of the variable pulleys 42 and 46, and the power is transmitted through a frictional force between the pair of the variable pulleys 42, 46 and the transmission belt 48.

The primary pulley 42 includes a fixed rotating body (fixed sheave) 42$a$ as an input-side fixed rotating body fixed to the input shaft 32, a movable rotating body (movable sheave) 42$b$ as an input-side movable rotating body disposed relatively non-rotatably around the axis and movably in the axial direction relative to the input shaft 32, and an input-side hydraulic cylinder (primary-side hydraulic cylinder) 42$c$ as a hydraulic actuator applying an input-side thrust force (primary thrust force) Win (=a primary pressure Pin×a pressure receiving area) in the primary pulley 42 for changing a V-groove width therebetween. The secondary pulley 46 includes a fixed rotating body (fixed sheave) 46$a$ as an output-side fixed rotating body fixed to the output shaft 44, a movable rotating body (movable sheave) 46$b$ as an output-side movable rotating body disposed relatively non-rotatably around the axis and movably in the axial direction relative to the output shaft 44, and an output-side hydraulic cylinder (secondary-side hydraulic cylinder) 46$c$ as a hydraulic actuator applying an output-side thrust force (secondary thrust force) Wout (=a secondary pressure Pout×a pressure receiving area) in the secondary pulley 46 for changing a V-groove width therebetween.

The primary pressure Pin, i.e., an oil pressure to the primary-side hydraulic cylinder 42c, and the secondary pressure Pout, i.e., an oil pressure to the secondary-side hydraulic cylinder 46c, are adjusted and controlled independently of each other by a hydraulic control circuit 100 (see FIG. 3) to respectively directly or indirectly control the primary thrust force Win and the secondary thrust force Wout. As a result, the V-groove widths of the pair of the variable pulleys 42 and 46 are changed to vary the winding diameters (effective diameters) of the transmission belt 48 so as to continuously vary a gear ratio (gear ratio) $\gamma$ (=input shaft rotation speed $N_{IN}$/output shaft rotation speed $N_{OUT}$) while a friction force (belt clamping pressure) between the pair of the variable pulleys 42, 46 and the transmission belt 48 is controlled so as not to cause a slip of the transmission belt 48. Therefore, the primary thrust force Win and the secondary thrust force Wout are respectively controlled to set an actual gear ratio (actual gear ratio) $\gamma$ to a target gear ratio $\gamma^*$ while a slip of the transmission belt 48 is prevented. The input shaft rotation speed $N_{IN}$ is a rotation speed of the input shaft 32 and the output shaft rotation speed $N_{OUT}$ is a rotation speed of the output shaft 44.

In the present embodiment, as can be seen from FIG. 1, the input shaft rotation speed $N_{IN}$ is the same as the rotation speed of the primary pulley 42 and the output shaft rotation speed $N_{OUT}$ is the same as the rotation speed of the secondary pulley 46.

In the continuously variable transmission 18, for example, when the primary pressure Pin is increased, the V-groove width of the primary pulley 42 is narrowed and the gear ratio $\gamma$ is reduced, i.e., the continuously variable transmission 18 is shifted up. When the primary pressure Pin is decreased, the V-groove width of the primary pulley 42 is widened and the gear ratio $\gamma$ is increased, i.e., the continuously variable transmission 18 is shifted down. Therefore, when the V-groove width of the primary pulley 42 is minimized, a minimum gear ratio $\gamma$min (the highest-speed-side gear ratio, the Highest) is formed as the gear ratio $\gamma$ of the continuously variable transmission 18. When the V-groove width of the primary pulley 42 is maximized, a maximum gear ratio $\gamma$max (the lowest-speed-side gear ratio, the Lowest) is formed as the gear ratio $\gamma$ of the continuously variable transmission 18. While a slip of the transmission belt 48 (belt slip) is prevented by the primary pressure Pin (having the same meaning as the primary thrust force Win) and the secondary pressure Pout (having the same meaning as the secondary thrust force Wout), the target gear ratio $\gamma^*$ is achieved in accordance with correlation between the primary thrust force Win and the secondary thrust force Wout, and an intended shift is not achieved by only one pulley pressure (having the same meaning as a thrust force).

Figure 2:
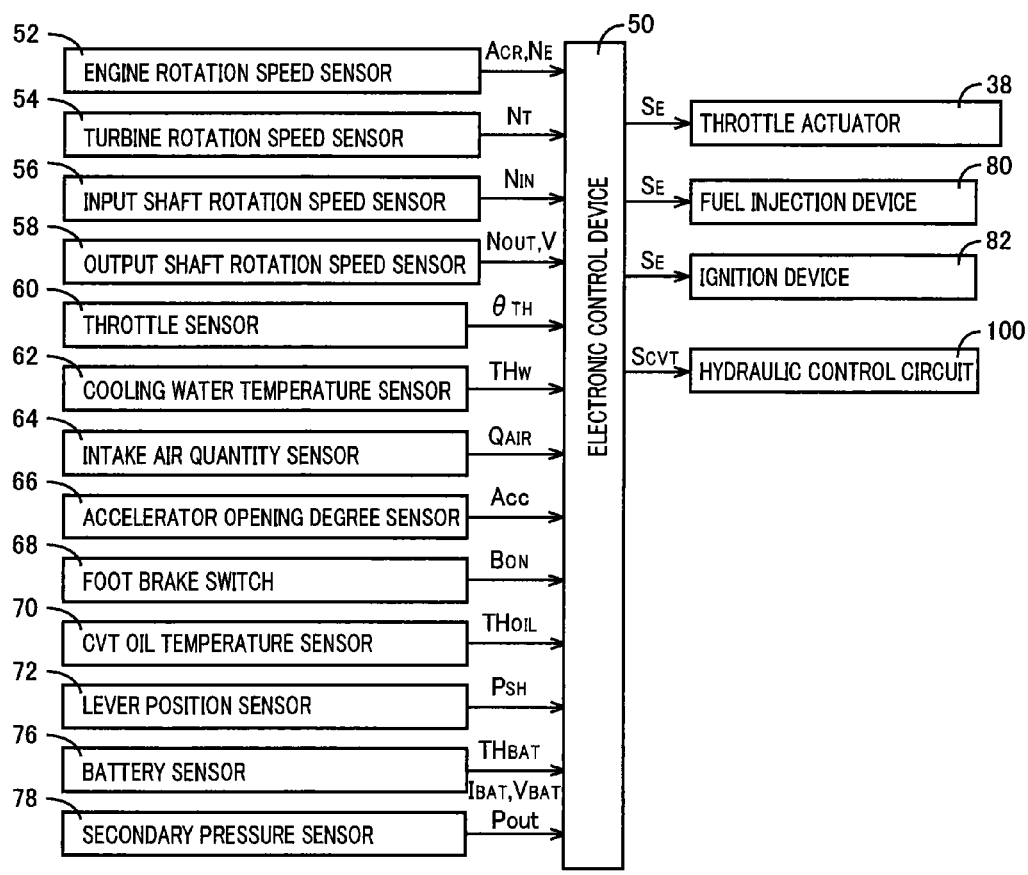
FIG. 2 is a block diagram for explaining a main portion of a control system disposed in the vehicle.

FIG. 2 is a block diagram for explaining a main portion of a control system disposed in the vehicle 10 for controlling the engine 12 and the continuously variable transmission 18. In FIG. 2, the vehicle 10 includes an electronic control device 50 including a control device of a continuously variable transmission for a vehicle related to the shift control of the continuously variable transmission 18, for example. The electronic control device 50 includes a so-called microcomputer having a CPU, a RAM, a ROM, and an I/O interface, for example, and the CPU executes signal processes in accordance with programs stored in advance in the ROM, while utilizing a temporary storage function of the RAM, to provide various controls of the vehicle 10. For example, the electronic control device 50 provides the output control of the engine 12, the shift control and the belt clamping pressure control of the continuously variable transmission 18, the torque capacity control of the lockup clutch 26, etc., and is configured separately for the engine control, the hydraulic control of the continuously variable transmission 18 and the lockup clutch 26, etc., as needed.

The electronic control device 50 is supplied with signals indicative of a rotation angle (position) $A_{CR}$ of the crankshaft 13 and a rotation speed (engine rotation speed) $N_E$ of the engine 12 detected by an engine rotation speed sensor 52; a signal indicative of a rotation speed (turbine rotation speed) $N_T$ of the turbine shaft 30 detected by a turbine rotation speed sensor 54; a signal indicative of the input shaft rotation speed $N_{IN}$ that is an input rotation speed of the continuously variable transmission 18 detected by an input shaft rotation speed sensor 56; a signal indicative of the output shaft rotation speed $N_{OUT}$ that is an output rotation speed of the continuously variable transmission 18 corresponding to a vehicle speed V detected by an output shaft rotation speed sensor 58; a signal indicative of a throttle valve opening degree $\theta_{TH}$ of the electronic throttle valve 40 detected by a throttle sensor 60; a signal indicative of a cooling water temperature $TH_W$ of the engine 12 detected by a cooling water temperature sensor 62; a signal indicative of the intake air quantity $Q_{AIR}$ of the engine 12 detected by an intake air quantity sensor 64; a signal indicative of an accelerator opening degree Acc that is an operation amount of an accelerator pedal as an acceleration request amount of a driver detected by an accelerator opening degree sensor 66; a signal indicative of brake-on $B_{ON}$ indicative of a state of operating a foot brake, i.e., a regular brake, detected by a foot brake switch 68; a signal indicative of an oil temperature $TH_{OIL}$ of the operating oil of the continuously variable transmission 18 etc., detected by a CVT oil temperature sensor 70; a signal indicative of a lever position (operation position) $P_{SH}$ of a shift lever detected by a lever position sensor 72; signals indicative of a battery temperature $TH_{BAT}$, a battery input/output current (battery charging/discharging current) $I_{BAT}$, and a battery voltage $V_{BAT}$ detected by a battery sensor 76; a signal indicative of the secondary pressure Pout that is a supply oil pressure to the secondary pulley 46 detected by a secondary pressure sensor 78, etc. The electronic control device 50 sequentially calculates a state of charging (charging capacity) SOC of a battery (electric storage device) based on the battery temperature $TH_{BAT}$, the battery charging/discharging current $I_{BAT}$, and the battery voltage $V_{BAT}$, for example. The electronic control device 50 sequentially calculates the actual gear ratio $\gamma$ (=$N_{IN}/N_{OUT}$ of the continuously variable transmission 18 based on the output shaft rotation speed $N_{OUT}$ and the input shaft rotation speed $N_{IN}$, for example.

The electronic control device 50 outputs an engine output control command signal $S_E$ for the output control of the engine 12, an hydraulic control command signal $S_{CVT}$ for the hydraulic control related to the shift of the continuously variable transmission 18, etc. Specifically, the electronic control device 50 outputs a throttle signal for controlling opening/closing of the electronic throttle valve 40 by driving the throttle actuator 38, an injection signal for controlling an amount of fuel injected from a fuel injection device 80, an ignition timing signal for controlling the timing of ignition of the engine 12 by an ignition device 82, etc., as the engine output control command signal $S_E$. The electronic control device 50 outputs a command signal for driving a linear solenoid valve SLP adjusting the primary pressure Pin, a command signal for driving a linear solenoid valve SLS adjusting the secondary pressure Pout, and a command signal for driving a linear solenoid valve SLT controlling a line oil pressure $P_L$, etc., as the hydraulic control command signal $S_{CVT}$ to the hydraulic control circuit 100.

Figure 3:
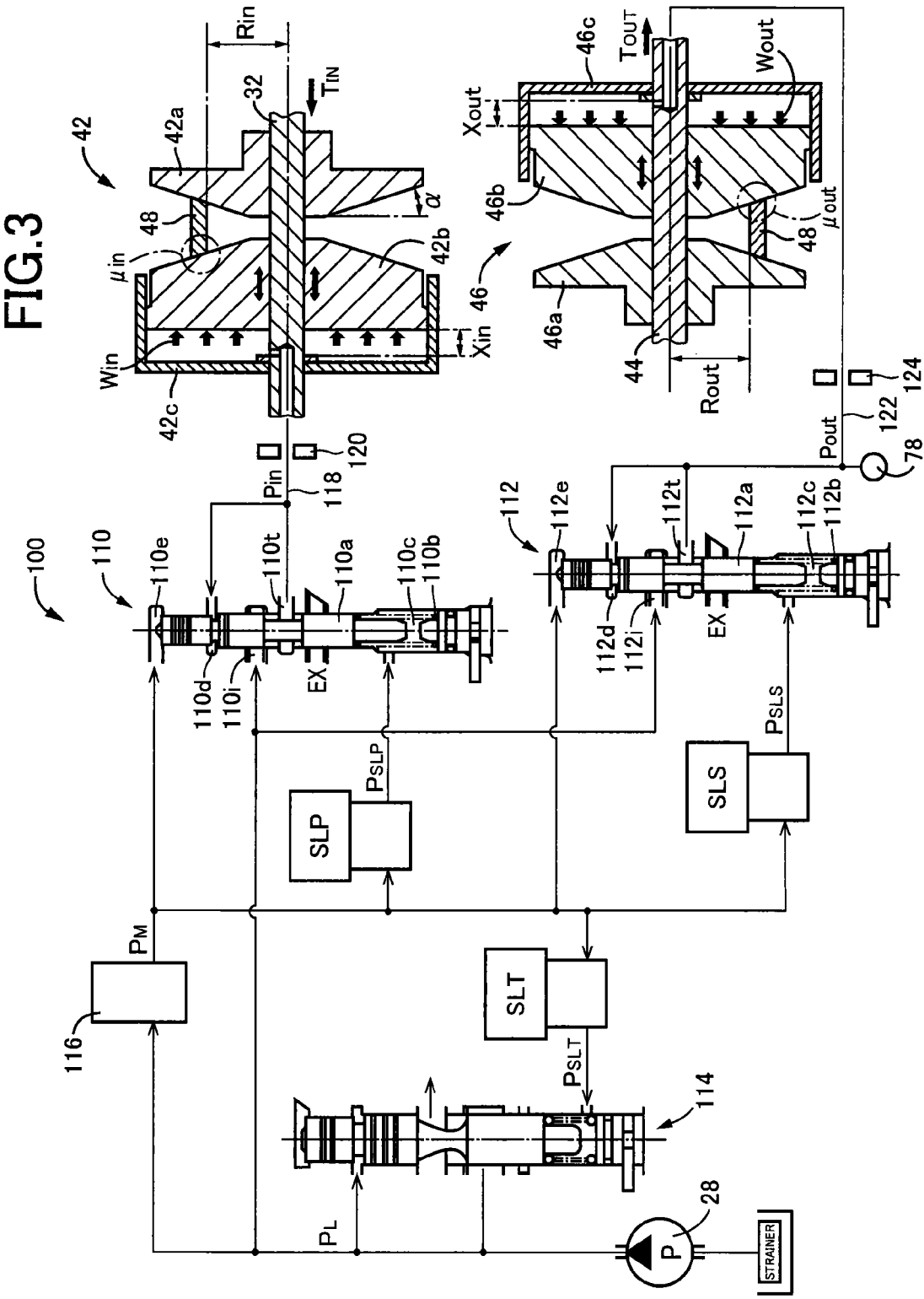
FIG. 3 is a hydraulic circuit diagram of a main portion relevant to hydraulic control related to the shift of the continuously variable transmission in the hydraulic control circuit.

FIG. 3 is a hydraulic circuit diagram of a main portion relevant to hydraulic control related to the shift of the continuously variable transmission 18 in the hydraulic control circuit 100. In FIG. 3, the hydraulic control circuit 100 includes, for example, the oil pump 28, a primary pressure control valve 110 adjusting the primary pressure Pin, a secondary pressure control valve 112 adjusting the secondary pressure Pout, a primary regulator valve (line oil pressure adjusting valve) 114, a modulator valve 116, the linear solenoid valve SLT, the linear solenoid valve SLP, the linear solenoid valve SLS, etc.

The line oil pressure $P_L$ is adjusted, for example, from an original pressure that is an operating oil pressure output (generated) from the oil pump 28, by the relief type primary regulator valve 114 to a value corresponding to an engine load etc., based on a control oil pressure $P_{SLT}$ that is an output oil pressure of the linear solenoid valve SLT. Specifically, the line oil pressure $P_L$ is adjusted based on the control oil pressure $P_{SLT}$ set to acquire an oil pressure obtained by adding a predetermined allowance (margin) to a higher one of the primary pressure Pin and the secondary pressure Pout. Therefore, the insufficient line oil pressure $P_L$ can be avoided when used as the original pressure in the adjustment operation of the primary pressure control valve 110 and the secondary pressure control valve 112, and the line oil pressure $P_L$ can be prevented from being unnecessarily increased. A modulator oil pressure $P_M$ acts as original pressures of a control oil pressure $P_{SLT}$ controlled by the electronic control device 50, a control oil pressure $P_{SLP}$ that is an output oil pressure of the linear solenoid valve SLP, and a control oil pressure $P_{SLS}$ that is an output oil pressure of the linear solenoid valve SLS, and is adjusted from an original pressure that is the line oil pressure $P_L$ by the modulator valve 116 to a constant pressure.

The primary pressure control valve 110 includes a spool valve piece 110a disposed movably in the axial direction to open/close an input port 110i so that the line oil pressure $P_L$ can be supplied from the input port 110i through an output port 110t to the primary pulley 42; a spring 110b acting as a biasing means biasing the spool valve piece 110a in the valve-opening direction; an oil chamber 110c housing the spring 110b and receiving the control oil pressure $P_{SLP}$ for applying a thrust force in the valve-opening direction to the spool valve piece 110a; a feedback oil chamber 110d receiving the line oil pressure $P_L$ output from the output port 110t for applying a thrust force in the valve-closing direction to the spool valve piece 110a; and an oil chamber 110e receiving the modulator oil pressure $P_M$ for applying a thrust force in the valve-closing direction to the spool valve piece 110a. The primary pressure control valve 110 configured as above uses, for example, the control oil pressure $P_{SLP}$ as a pilot pressure to adjust and control the line oil pressure $P_L$ and supplies the line oil pressure $P_L$ to the primary-side hydraulic cylinder 42c of the primary pulley 42. As a result, the primary pressure Pin supplied to the primary-side hydraulic cylinder 42c is controlled. For example, if the control oil pressure $P_{SLP}$ output from the linear solenoid valve SLP increases from the state in which the primary-side hydraulic cylinder 42c is supplied with a predetermined oil pressure, the spool valve piece 110a of the primary pressure control valve 110 moves toward the upper side of FIG. 3. As a result, the primary pressure Pin to the primary-side hydraulic cylinder 42c increases. On the other hand, if the control oil pressure $P_{SLP}$ output from the linear solenoid valve SLP decreases from the state in which the primary-side hydraulic cylinder 42c is supplied with a predetermined oil pressure, the spool valve piece 110a of the primary pressure control valve 110 moves toward the lower side of FIG. 3. As a result, the primary pressure Pin to the primary-side hydraulic cylinder 42c decreases.

An orifice 120 is disposed in an oil passage 118 between the primary-side hydraulic cylinder 42c and the primary pressure control valve 110 for the purpose of fail-safe etc. Because the orifice 120 is disposed, the internal pressure of the primary-side hydraulic cylinder 42c does not rapidly decrease even if the linear solenoid valve SLP breaks down, for example. This suppresses the rapid deceleration of the vehicle 10 due to a breakdown of the linear solenoid valve SLP, for example.

The secondary pressure control valve 112 includes a spool valve piece 112a disposed movably in the axial direction to open/close an input port 112i so that the line oil pressure $P_L$ can be supplied from the input port 112i through an output port 112t to the secondary pulley 46 as the secondary pressure Pout; a spring 112b acting as a biasing means biasing the spool valve piece 112a in the valve-opening direction; an oil chamber 112c housing the spring 112b and receiving the control oil pressure $P_{SLS}$ for applying a thrust force in the valve-opening direction to the spool valve piece 112a; a feedback oil chamber 112d receiving the secondary pressure Pout output from the output port 112t for applying a thrust force in the valve-closing direction to the spool valve piece 112a; and an oil chamber 112e receiving the modulator oil pressure $P_M$ for applying a thrust force in the valve-closing direction to the spool valve piece 112a. The secondary pressure control valve 112 configured as above uses, for example, the control oil pressure $P_{SLS}$ as a pilot pressure to adjust and control the line oil pressure $P_L$ and supplies the line oil pressure $P_L$ to the secondary-side hydraulic cylinder 46c of the secondary pulley 46. As a result, the secondary pressure Pout supplied to the secondary-side hydraulic cylinder 46c is controlled. For example, if the control oil pressure $P_{SLS}$ output from the linear solenoid valve SLS increases from the state in which the secondary-side hydraulic cylinder 46c is supplied with a predetermined oil pressure, the spool valve piece 112a of the secondary pressure control valve 112 moves toward the upper side of FIG. 3. As a result, the secondary pressure Pout to the secondary-side hydraulic cylinder 46c increases. On the other hand, if the control oil pressure $P_{SLS}$ output by the linear solenoid valve SLS decreases from the state in which the secondary-side hydraulic cylinder 46c is supplied with a predetermined oil pressure, the spool valve piece 112a of the secondary pressure control valve 112 moves toward the lower side of FIG. 3. As a result, the secondary pressure Pout to the secondary-side hydraulic cylinder 46c decreases.

An orifice 124 is disposed in an oil passage 122 between the secondary-side hydraulic cylinder 46c and the secondary pressure control valve 112 for the purpose of fail-safe etc. Because the orifice 124 is disposed, the internal pressure of the secondary-side hydraulic cylinder 46c does not rapidly decrease even if the linear solenoid valve SLS breaks down, for example. This prevents a belt slip due to a breakdown of the linear solenoid valve SLS, for example.

In the hydraulic control circuit 100 configured as above, for example, the primary pressure Pin adjusted by the linear solenoid valve SLP and the secondary pressure Pout adjusted by the linear solenoid valve SLS are controlled so as to generate a belt clamping pressure without causing a belt slip and without an unnecessary increase in a pair of the variable pulleys 42 and 46. As described later, the correlation between the primary pressure Pin and the secondary pressure Pout changes a thrust force ratio $\tau$ (=Wout/Win) of a pair of the variable pulleys 42 and 46 to vary the gear ratio $\gamma$ of the continuously variable transmission 18. For example, as the thrust force ratio τ is made larger, the gear ratio γ is made larger (i.e., the continuously variable transmission 18 is shifted down).

Figure 4:
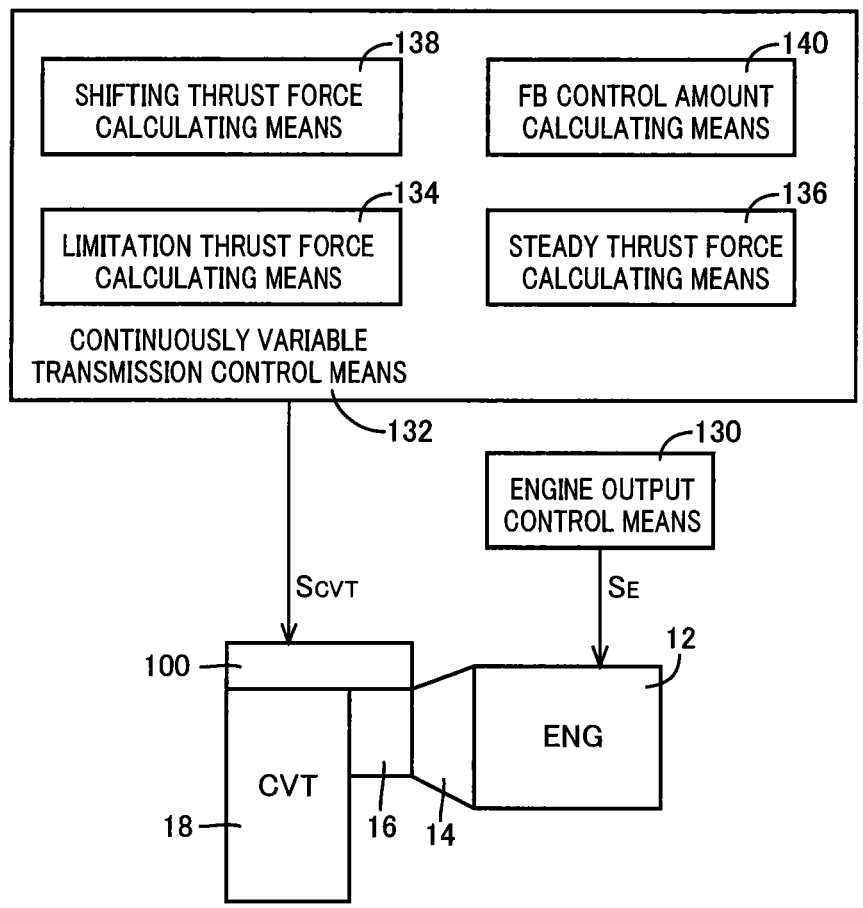
FIG. 4 is a functional block diagram for explaining a main portion of the control function of the electronic control device.

FIG. 4 is a functional block diagram for explaining a main portion of the control function of the electronic control device 50. In FIG. 4, an engine output control portion, i.e., an engine output control means 130 outputs, for example, the engine output control command signal $S_E$ such as the throttle signal, the injection signal, and the ignition timing signal to the throttle actuator 38, the fuel injection device 80, and the ignition device 82, respectively, for the output control of the engine 12. For example, the engine output control means 130 sets a target engine torque $T_E^*$ for acquiring a drive force (drive torque) corresponding to the accelerator opening degree Acc, controls the opening/closing of the electronic throttle valve 40 through the throttle actuator 38 so as to acquire the target engine torque $T_E^*$, controls a fuel injection amount through the fuel injection device 80, and controls the ignition timing through the ignition device 82.

A continuously variable transmission control portion, i.e., a continuously variable transmission control means 132 determines a primary instruction pressure Pintgt as a command value (or target primary pressure Pin*) of the primary pressure Pin and a secondary instruction pressure Pouttgt as a command value (or target secondary pressure Pout*) of the secondary pressure Pout such that the target gear ratio γ* of the continuously variable transmission 18 is achieved while a belt slip of the continuously variable transmission 18 is prevented from occurring, for example, and outputs the primary instruction pressure Pintgt and the secondary instruction pressure Pouttgt to the hydraulic control circuit 100.

The hydraulic control circuit 100 of this embodiment includes the secondary pressure sensor 78 as an oil pressure sensor for detecting an actual secondary pressure Pout acting on the secondary pulley 46 (the secondary-side hydraulic cylinder 46c) only on the side of the secondary pulley 46, i.e., one of a pair of the variable pulleys 42 and 46. Therefore, the continuously variable transmission control means 132 can provide feedback control of setting a detection value of the secondary pressure sensor 78 (a signal indicative of the actual secondary pressure Pout) to the target secondary pressure Pout* corresponding to a target secondary thrust force Wout*, for example. As a result, a thrust force (pulley pressure) can accurately be controlled on the side of the secondary pulley 46 as compared to the side of the primary pulley 42 without an oil pressure sensor. Therefore, in this embodiment, the hydraulic control circuit 100 is included that can accurately control the thrust force (pulley pressure) of the secondary pulley 46, i.e., one of the primary pulley 42 and the secondary pulley 46, as compared to the other one, i.e., the primary pulley 42.

Therefore, if a target thrust force is set to a thrust force required for preventing a belt slip with a minimum requisite thrust force (a required thrust force), i.e., a belt slip limitation thrust force that is a thrust force immediately before the occurrence of a belt slip (hereinafter, a slip limitation thrust force), a thrust force corresponding to oil pressure variation, i.e., a gap between the oil pressure command value (the primary instruction pressure Pintgt) and the actual oil pressure (the actual primary pressure Pin), must be added to the slip limitation thrust force so as to certainly ensure the slip limitation thrust force on the side of the primary pulley 42 having a relatively lower hydraulic control accuracy (i.e., unable to provide feedback control based on a deviation between a detection value of the oil pressure sensor and a target value). As a result, because of the correlation between the primary pressure Pin (the primary thrust force Win) and the secondary pressure Pout (the secondary thrust force Wout) based on the thrust force ratio τ (=Wout/Win) for achieving an intended shift, the target secondary thrust force Wout* must also be increased in accordance with a thrust force corresponding to the oil pressure variation on the side of the primary pulley 42, which may deteriorate fuel efficiency. Even if an oil pressure sensor is not included, a thrust force can be corrected through feedback control based on a gear ratio deviation Δγ (=γ*−γ) between the target gear ratio γ* and the actual gear ratio γ and, therefore, the hydraulic control accuracy may not necessarily be high in terms of achievement of an intended shift.

Thus, in this embodiment, for example, on the side of the secondary pulley 46 with relatively higher hydraulic control accuracy, the slip limitation thrust force on the side of the secondary pulley 46 is naturally ensured and the slip limitation thrust force on the side of the primary pulley 42 is also ensured, i.e., the belt torque capacities of the both pulleys 42 and 46 are assured. On the side of the primary pulley 42 with relatively lower hydraulic control accuracy, a target primary thrust force Win* corresponding to a target secondary thrust force Wout* for assuring the belt slip prevention is set to achieve an intended shift. In this case, the feedback control based on the gear ratio deviation Δγ is provided so as to avoid fuel efficiency deterioration due to oil pressure variation on the side of the primary pulley 42.

Specifically, the continuously variable transmission control means 132 selects as the target secondary thrust force Wout*, for example, a larger one of a secondary-pulley-side slip limitation thrust force Woutlmt that is a slip limitation thrust force on the side of the secondary pulley 46 and a secondary-pulley-side shift control thrust force Woutsh that is a thrust force on the side of the secondary pulley 46 required for shift control calculated based on a primary-pulley-side slip limitation thrust force Winlmt that is a slip limitation thrust force on the side of the primary pulley 42. The continuously variable transmission control means 132 sets as the target primary thrust force Win*, for example, a primary-pulley-side shift control thrust force Winsh that is a thrust force on the side of the primary pulley 42 required for shift control calculated based on the selected target secondary thrust force Wout*. The continuously variable transmission control means 132 corrects the target primary thrust force Win* (i.e., the primary-pulley-side shift control thrust force Winsh) through feedback control of the primary thrust force Win based on the gear ratio deviation Δγ between the target gear ratio γ* and the actual gear ratio γ, for example.

The gear ratio deviation Δγ may be a deviation between a target value and an actual value of a parameter corresponding one-to-one to the gear ratio γ. For example, the gear ratio deviation Δγ may be replaced with a deviation ΔXin (=Xin*−Xin) between a target pulley position Xin* and an actual pulley position Xin (see FIG. 3) on the side of the primary pulley 42, a deviation ΔXout (=Xout*−Xout) between a target pulley position Xout* and an actual pulley position Xout (see FIG. 3) on the side of the secondary pulley 46, a deviation ΔRin (=Rin*−Rin) between a target belt winding diameter Rin* and an actual belt winding diameter Rin (see FIG. 3) on the side of the primary pulley 42, a deviation ΔRout (=Rout*−Rout) between a target belt winding diameter Rout* and an actual belt winding diameter Rout (see FIG. 3) on the side of the secondary pulley 46, a deviation $\Delta N_{IN}$ (=$N_{IN}^*$−$N_{IN}$) between a target input shaft rotation speed $N_{IN}^*$ and an actual input shaft rotation speed $N_{IN}$, etc.

The thrust force required for the shift control is, for example, a thrust force required for achieving an intended shift and a thrust force required for achieving the target gear ratio γ* and a target shift speed. Although a shift speed is, for example, a change amount dγ of the gear ratio γ per unit time (=dγ/dt), a shift speed is defined in this embodiment as a pulley position movement amount per belt element (block) (dX/dNelm) (dX: an axial displacement amount of the pulley per unit time [mm/ms], dNelm: the number of elements (blocks) engaged with a pulley per unit time [elements/ms]). Therefore, the target shift speed is represented by a primary-side target shift speed (dXin/dNelmin) and a secondary-side target shift speed (dXout/dNelmout). Specifically, a primary thrust force Win and a secondary thrust force Wout in a steady state (while the gear ratio γ is constant) are referred to as a balance thrust force (steady thrust force) Wbl (e.g., a primary balance thrust force Winbl and a secondary balance thrust force Woutbl) and a ratio thereof is the thrust force ratio τ (=Woutbl/Winbl). In the steady state while the primary thrust force Win and the secondary thrust force Wout maintain a constant gear ratio γ, if a certain thrust force is added to or subtracted from a thrust force of one of a pair of the variable pulleys 42 and 46, the steady state is disturbed and a gear ratio γ is changed, resulting in a shift speed (dX/dNelm) corresponding to the amplitude of the added or subtracted thrust force. This added or subtracted thrust force is referred to as a shifting thrust force (transient thrust force) ΔW (e.g., a primary shifting thrust force ΔWin and a secondary shifting thrust force ΔWout). Therefore, if one thrust force of one side is set, the thrust force required for the shift control is the sum of the balance thrust force Wbl of the other side for achieving the target gear ratio γ* corresponding to the thrust force of the one side based on the thrust force ratio τ for maintaining the target gear ratio γ* and the shifting thrust force ΔW for achieving the target shift speed (e.g., the primary-side target shift speed (dXin/dNelmin) and the secondary-side target shift speed (dXout/dNelmout)) when the target gear ratio γ* is changed. If an intended shift is achieved on the side of the primary pulley 42, a shifting thrust force ΔW, i.e., a primary shifting thrust force ΔWin in terms of the primary pulley side satisfies (ΔWin>0) in the case of the upshift state, (ΔWin<0) in the case of the downshift state, and (ΔWin=0) in the case of the steady state while a gear ratio is constant. If an intended shift is achieved on the side of the secondary pulley 46, a shifting thrust force ΔW, i.e., a secondary shifting thrust force ΔWout in terms of the secondary pulley side satisfies (ΔWout<0) in the case of the upshift state, (ΔWout>0) in the case of the downshift state, and (ΔWout=0) in the case of the steady state while a gear ratio is constant.

FIG. 5 is a diagram for explaining a thrust force required for the shift control. FIG. 5 depicts an example of the primary thrust force Win set when an intended upshift is achieved on the side of the primary pulley 42 if the secondary thrust force Wout is set such that the belt slip prevention is implemented on the side of the secondary pulley 46, for example. In FIG. 5(a), since the steady state is achieved with a constant target gear ratio γ* and ΔWin=0 is satisfied before time t1 or after time t3, the primary thrust force Win is only the primary balance thrust force Winbl (=Wout/τ). Since the upshift state is achieved with a reduced target gear ratio γ* from time t1 to time t3, the primary thrust force Win is the sum of the primary balance thrust force Winbl and the primary shifting thrust force ΔWin as represented in a diagram of thrust force relationship at time t2 of FIG. 5(a) depicted in FIG. 5(b). A shaded portion of each thrust force depicted in FIG. 5(b) corresponds to a balance thrust force Wbl for maintaining the target gear ratio γ* at time t2 of FIG. 5(a).

Figure 6:
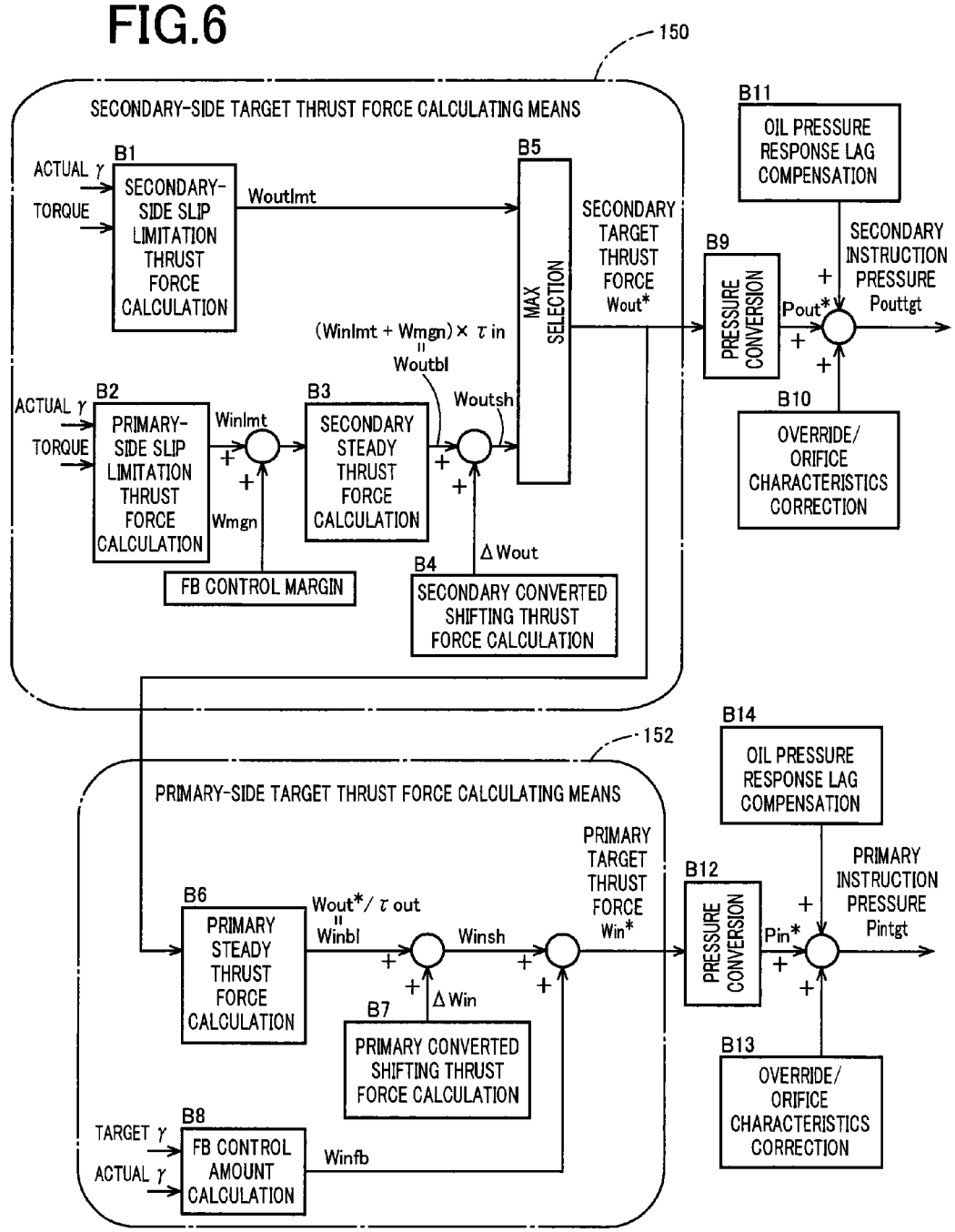
FIG. 6 is a block diagram of a control structure in the present embodiment.

FIG. 6 is a block diagram of a control structure for satisfying both the intended shift and the belt slip prevention with a minimum requisite thrust force when the secondary pressure sensor 78 is included only on the side of the secondary pulley 46. In FIG. 6, the target gear ratio γ* and an input torque $T_{IN}$ of the continuously variable transmission 18 are sequentially calculated by the continuously variable transmission control means 132, for example.

Figure 7:
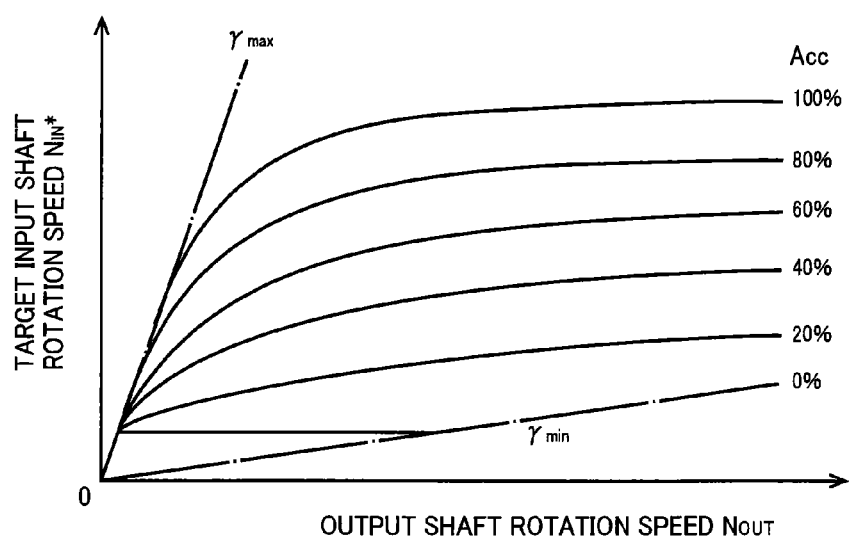
FIG. 7 is a diagram of one example of a shift map used when a target input shaft rotation speed is obtained in the hydraulic control related to the shift of the continuously variable transmission.

Specifically, the continuously variable transmission control means 132 determines a post-shift target gear ratio γ*1 that is a gear ratio γ to be achieved after a shift of the continuously variable transmission 18. The continuously variable transmission control means 132 sets a target input shaft rotation speed $N_{IN}$* based on a vehicle state indicated by the actual output shaft rotation speed $N_{OUT}$ and the accelerator opening degree Acc from a preliminarily obtained and stored relationship (shift map) between the output shaft rotation speed $N_{OUT}$ and the target input shaft rotation speed $N_{IN}$* by using the accelerator opening degree Acc as a parameter as depicted in FIG. 7, for example. The continuously variable transmission control means 132 calculates the post-shift target gear ratio γ*1 (=$N_{IN}$*/$N_{OUT}$) based on the target input shaft rotation speed $N_{IN}$*. The shift map of FIG. 7 corresponds to a shift condition and has the target input shaft rotation speed $N_{IN}$* set such that a greater gear ratio γ is achieved when the output shaft rotation speed $N_{OUT}$ is smaller and the accelerator opening degree Acc is larger. The post-shift target gear ratio γ*1 is set within a range between a minimum gear ratio γmin (the highest-speed gear ratio, the Highest) and a maximum gear ratio γmax (the lowest-speed gear ratio, the Lowest) of the continuously variable transmission 18. The continuously variable transmission control means 132 determines the target gear ratio γ* as a target value of a transient gear ratio γ during a shift based on the gear ratio γ before starting the shift, the post-shift target gear ratio γ*1, and a difference therebetween, from a relationship empirically set in advance such that, for example, a quick and smooth shift is achieved. For example, the continuously variable transmission control means 132 determines the target gear ratio γ* sequentially changed during a shift as a function of elapsed time varying along a smooth curve (e.g., a first-order lag curve or a second-order lag curve) changing toward the post-shift target gear ratio γ*1 from the start of the shift. Therefore, the continuously variable transmission control means 132 sequentially changes the target gear ratio γ* during a shift of the continuously variable transmission 18 such that the gear ratio γ before starting the shift approaches the post-shift target gear ratio γ*1 as the time elapses from the start of the shift. When determining the target gear ratio γ* as the function of elapsed time, the continuously variable transmission control means 132 calculates target shift speeds (a primary-side target shift speed (dXin/dNelmin) and a secondary-side target shift speed (dXout/dNelmout)) during the shift from the target gear ratio γ*. For example, when the shift is completed and the steady state is achieved with the constant target gear ratio γ*, the target shift speeds are zero.

Figure 8:
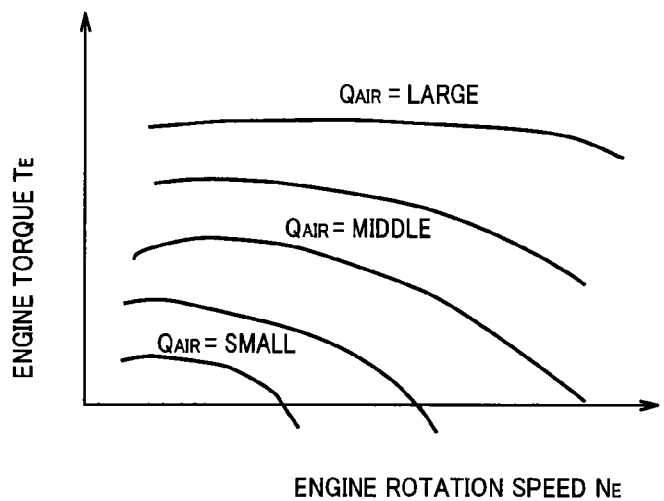
FIG. 8 is a diagram of one example of a map between the engine rotation speed and the engine torque empirically obtained and stored in advance by using the intake air quantity as a parameter.
Figure 9:
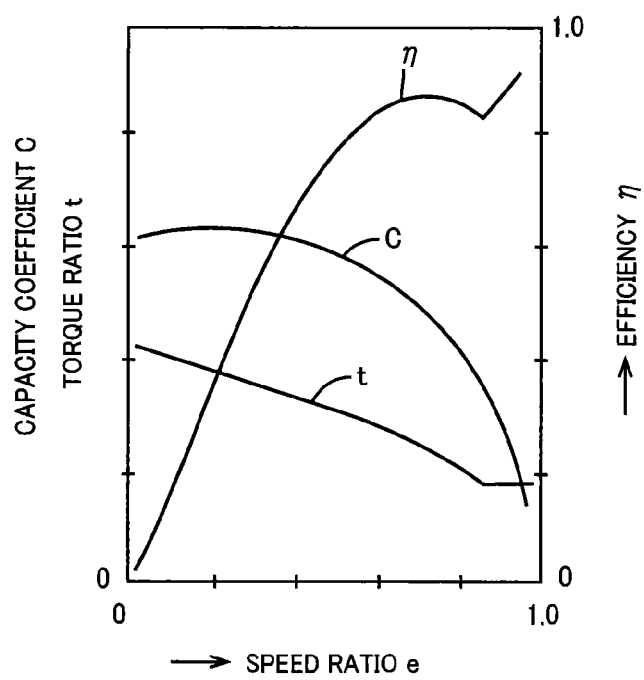
FIG. 9 is a diagram of one example of a map empirically obtained and stored in advance as a predetermined operation characteristic of the torque converter.

The continuously variable transmission control means 132 calculates the input torque $T_{IN}$ of the continuously variable transmission 18 as a torque (=$T_E$×t) acquired by multiplying an engine torque $T_E$ by a torque ratio t of the torque converter 14 (=a turbine torque $T_T$ that is the output torque of the torque converter 14/a pump torque $T_P$ that is the input torque of the torque converter 14), for example. The continuously variable transmission control means 132 calculates the engine torque $T_E$ as an estimated engine torque $T_E$es based on the intake air quantity $Q_{AIR}$ and the engine rotation speed $N_E$ from a relationship (a map, an engine torque characteristic diagram) between the engine rotation speed $N_E$ and the engine torque $T_E$ empirically obtained and stored in advance by using the intake air quantity $Q_{AIR}$ acting as a request load to the engine 12 (or a throttle valve opening degree $\theta_{TH}$ corresponding thereto etc.) as a parameter as depicted in FIG. 8, for example. Alternatively, for example, an actual output torque (actual engine torque) $T_E$ etc., of the engine 12 detected by a torque sensor etc., may be used for this engine torque $T_E$. The torque ratio t of the torque converter 14 is a function of a speed ratio e of the torque converter 14 (=a turbine rotation speed $N_T$ that is the output rotation speed of the torque converter 14/a pump rotation speed $N_P$ (the engine rotation speed $N_E$) that is the input rotation speed of the torque converter 14) and is calculated by the continuously variable transmission control means 132 based on the actual speed ratio e from a relationship (a map, a predetermined operation characteristic diagram of the torque converter 14) between the speed ratio e and each of the torque ratio t, efficiency η, and a capacity coefficient C empirically obtained and stored in advance as depicted in FIG. 9, for example. The estimated engine torque $T_E$es is calculated to directly represent the actual engine torque $T_E$ and the estimated engine torque $T_E$es is assumed to be handled as the actual engine torque $T_E$ except the case that the actual engine torque $T_E$ is particularly distinguished. Therefore, the estimated engine torque $T_E$es is assumed to include the actual engine torque $T_E$.

The continuously variable transmission control means 132 includes, for example, a limitation thrust force calculating portion calculating a slip limitation thrust force Wlmt, i.e., a limitation thrust force calculating means 134, a steady thrust force calculating portion calculating a balance thrust force Wbl, i.e., a steady thrust force calculating means 136, a shifting thrust force calculating portion calculating a shifting thrust force ΔW, i.e., a shifting thrust force calculating means 138, and an FB control amount calculating portion calculating a feedback control amount Winfb, i.e., an FB control amount calculating means 140.

In block B1 and block B2 of FIG. 6, the limitation thrust force calculating means 134 calculates the slip limitation thrust force Wlmt based on the actual gear ratio γ and the input torque $T_{IN}$ of the continuously variable transmission 18, for example. Specifically, the limitation thrust force calculating means 134 calculates each of the secondary-pulley-side slip limitation thrust force Woutlmt and the primary-pulley-side slip limitation thrust force Winlmt from the following Equation (1) and Equation (2) based on the input torque $T_{IN}$ of the continuously variable transmission 18 as the input torque of the primary pulley 42, the output torque $T_{OUT}$ of the continuously variable transmission 18 as the input torque of the secondary pulley 46, a sheave angle α of the variable pulleys 42 and 46, a predetermined element-pulley friction coefficient μin on the side of the primary pulley 42, a predetermined element-pulley friction coefficient μout on the side of the secondary pulley 46, a belt winding diameter Rin on the side of the primary pulley 42 uniquely calculated from the actual gear ratio γ, and a belt winding diameter Rout on the side of the secondary pulley 46 uniquely calculated from the actual gear ratio γ (see FIG. 3). It is assumed that $T_{OUT}$=γ×Tin=(Rout/Rin)×Tin is satisfied.

$$Woutlmt = (T_{OUT} \times \cos \alpha)/(2 \times \mu out \times Rout) = (Tin \times \cos \alpha)/(2\mu out \times Rin) \quad (1)$$

$$Winlmt = (Tin \times \cos \alpha)/(2 \times \mu in \times Rin) \quad (2)$$

Figure 10A:
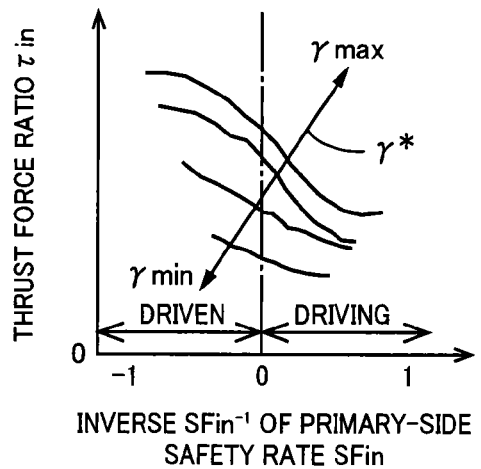
FIG. 10 is a diagram of one example of a thrust force ratio map between the inverse of the safety rate and the thrust force ratio empirically obtained and stored in advance by using the target gear ratio as a parameter.
Figure 10B:
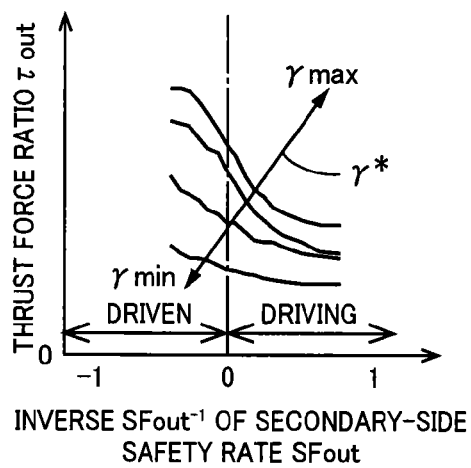

In block B3 and block B6 of FIG. 6, the steady thrust force calculating means 136 calculates each of the secondary balance thrust force Woutbl corresponding to the primary-pulley-side slip limitation thrust force Winlmt and the primary balance thrust force Winbl corresponding to the target secondary thrust force Wout*, for example. Specifically, the steady thrust force calculating means 136 calculates a thrust force ratio Tin based on a sequentially calculated target gear ratio γ* and an inverse $SFin^{-1}$ of a primary-side safety rate from a relationship (a thrust force ratio map) between the inverse $SFin^{-1}$ (=Winlmt/Win) of the primary-side safety rate SFin (=Win/Winlmt) and the thrust force ratio Tin at the time of calculation of a thrust force on the side of the secondary pulley 46 corresponding to the side of the primary pulley 42 empirically obtained and stored in advance by using the target gear ratio γ* as a parameter as depicted in FIG. 10(a), for example. The steady thrust force calculating means 136 calculates the secondary balance thrust force Woutbl based on the primary-pulley-side slip limitation thrust force Winlmt and the thrust force ratio Tin from the following Equation (3). The steady thrust force calculating means 136 calculates a thrust force ratio Tout based on a sequentially calculated target gear ratio γ* and an inverse $SFout^{-1}$ of a secondary-side safety rate from a relationship (a thrust force ratio map) between the inverse $SFout^{-1}$ (=Woutlmt/Wout) of the secondary-side safety rate SFout (=Wout/Woutlmt) and the thrust force ratio Tout at the time of calculation of a thrust force on the side of the primary pulley 42 corresponding to the side of the secondary pulley 46 empirically obtained and stored in advance by using the target gear ratio γ* as a parameter as depicted in FIG. 10(b), for example. The steady thrust force calculating means 136 calculates the primary balance thrust force Winbl based on the target secondary thrust force Wout* and the thrust force ratio Tout from the following Equation (4). Since the input torque $T_{IN}$ and the output torque $T_{OUT}$ has negative values at the time of being driven, the inverses $SFin^{-1}$ and $SFout^{-1}$ of the safety rates have negative values at the time of being driven. The inverses $SFin^{-1}$ and $SFout^{-1}$ may sequentially be calculated; however, if predetermined values (e.g., about 1 to 1.5) are respectively set as the safety rates SFin and SFout, the inverses thereof may be set.

$$Woutbl = Winlmt \times \tau in \quad (3)$$

$$Winbl = Wout^*/\tau out \quad (4)$$

Figure 11A:
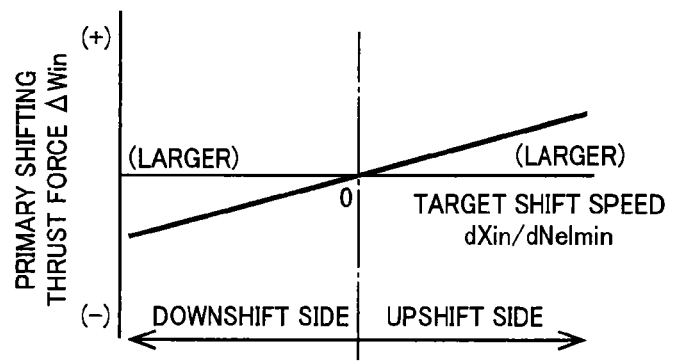
FIG. 11 is a diagram of one example of a shifting thrust force map between the target shift speed and the primary and secondary shifting thrust force forces empirically obtained and stored in advance.
Figure 11B:
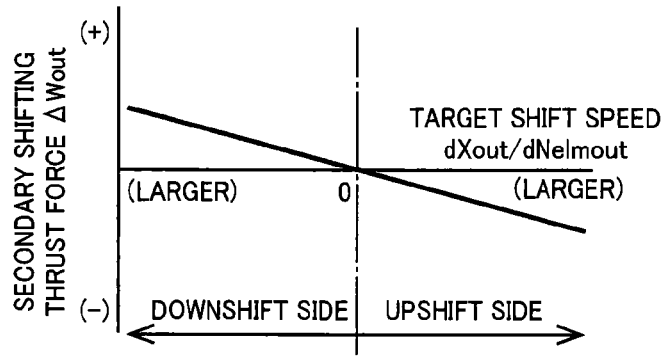

In block B4 and block B7 of FIG. 6, the shifting thrust force calculating means 138 calculates, for example, the secondary shifting thrust force ΔWout that is the shifting thrust force ΔW in terms of the secondary pulley side when an intended shift is achieved on the side of the secondary pulley 46, and the primary shifting thrust force ΔWin that is the shifting thrust force ΔW in terms of the primary pulley side when an intended shift is achieved on the side of the primary pulley 42. Specifically, the shifting thrust force calculating means 138 calculates the secondary shifting thrust force ΔWout based on the sequentially calculated secondary-side target shift speed (dXout/dNelmout) from a relationship (a shifting thrust force map) between the secondary-side target shift speed (dXout/dNelmout) and the secondary shifting thrust force ΔWout empirically obtained and stored in advance as depicted in FIG. 11(b), for example. The shifting thrust force calculating means 138 calculates the primary shifting thrust force ΔWin based on the sequentially calculated primary-side target shift speed (dXin/dNelmin) from a relationship (a shifting thrust force map) between the primary-side target shift speed (dXin/dNelmin) and the primary shifting thrust force ΔWin empirically obtained and stored in advance as depicted in FIG. 11(a), for example.

In the calculation in blocks B3 and B4, a physical characteristic diagram empirically obtained and set in advance is used such as a thrust force ratio map (see FIG. 10) and a shifting thrust force map (see FIG. 11). Therefore, individual differences of the hydraulic control circuit 100 etc., generate variation to physical characteristics in the calculation results of the secondary balance thrust force Woutbl and the secondary shifting thrust force ΔWout. Therefore, if consideration is given to such variation to physical characteristics, the limitation thrust force calculating means 134 adds to the primary-pulley-side slip limitation thrust force Winlmt, for example, a predetermined thrust force (control margin) Wmgn corresponding to the variation to physical characteristics related to the calculation of a thrust force on the side of the secondary pulley 46 (the secondary balance thrust force Woutbl and the secondary shifting thrust force ΔWout) based on the primary-pulley-side slip limitation thrust force Winlmt, before the calculation of the thrust force on the side of the secondary pulley 46. Therefore, if consideration is given to the variation to physical characteristics, in block B3, the steady thrust force calculating means 136 calculates the secondary balance thrust force Woutbl based on the primary-pulley-side slip limitation thrust force Winlmt with the control margin Wmgn added and the thrust force ratio τin from the following Equation (3)' instead of Equation (3), for example.

$$Woutbl=(Winlmt+Wmgn)\times\text{in} \qquad (3)'$$

Although the control margin Wmgn is, for example, a constant value (design value) empirically obtained and set in advance, the control margin Wmgn is set to a larger value in a transient state (during a shift) because the larger number of variation factors (physical characteristic diagrams of the thrust force ratio map and the shifting thrust force map) is used as compared to a steady state (a state with a constant gear ratio). The variation to physical characteristics related to the calculation is different from, for example, variation of the control oil pressures $P_{SLP}$ and $P_{SLS}$ to the control currents to the linear solenoid valves SLP and SLS, variation of a drive circuit outputting the control currents, and a gap of an actual oil pressure relative to an oil pressure command value for a pulley pressure such as variation of actual pulley pressures Pin and Pout relative to the control oil pressures $P_{SLP}$ and $P_{SLS}$ (oil pressure variation, variation in hydraulic control). Although the oil pressure variation may be a relatively large value in some units (hardware units such as the hydraulic control circuit 100), the variation to physical characteristics related to the calculation is an extremely small value as compared to the oil pressure variation. Therefore, when the control margin Wmgn is added to the primary-pulley-side slip limitation thrust force Winlmt, deterioration of fuel efficiency is suppressed as compared to when an oil pressure command value is increased by variation in control such that a target pulley pressure is acquired no matter how greatly the actual pulley pressure varies relative to the oil pressure command value of the pulley pressure. Since the calculation in blocks B6 and B7 is based on the target secondary thrust force Wout*, the control margin Wmgn is not added to the target secondary thrust force Wout* before the calculation.

The continuously variable transmission control means 132 calculates the secondary-pulley-side shift control thrust force Woutsh (=Woutbl+Wout) acquired by adding the secondary shifting thrust force ΔWout to the secondary balance thrust force Woutbl as a secondary thrust force required for preventing a belt slip on the side of the primary pulley 42, for example. In block B5 of FIG. 6, the continuously variable transmission control means 132 selects a larger one of the secondary-pulley-side slip limitation thrust force Woutlmt and the secondary-pulley-side shift control thrust force Woutsh as the target secondary thrust force Wout*.

The continuously variable transmission control means 132 calculates the primary-pulley-side shift control thrust force Winsh (=Winbl+ΔWin) by adding the primary shifting thrust force ΔWin to the primary balance thrust force Winbl, for example. In block B8 of FIG. 6, the FB control amount calculating means 140 calculates the feedback control amount (FB control correction amount) Winfb for matching an actual gear ratio γ to the target gear ratio γ* by using a feedback control equation obtained and set in advance as described by Equation (5), for example. In Equation (5), Δγ is a gear ratio deviation (=γ*−γ) between the target gear ratio γ* and the actual gear ratio γ; KP is a predetermined proportional constant; KI is a predetermined integration constant; and KD is a predetermined differential constant. The continuously variable transmission control means 132 sets as the target primary thrust force Win* a value (=Winsh+Winfb) acquired by correcting the primary-pulley-side shift control thrust force Winsh through feedback control based on the gear ratio deviation Δγ.

$$Winfb=KP\times\Delta\gamma+KI(\int\Delta\gamma dt)+KD\times(\Delta\gamma/dt) \qquad (5)$$

As described above, blocks B1 to B5 act as a secondary-side target thrust force calculating portion setting the target secondary thrust force Wout*, i.e., a secondary-side target thrust force calculating means 150. Blocks B6 to B8 act as a primary-side target thrust force calculating portion setting the target primary thrust force Win*, i.e., a primary-side target thrust force calculating means 152.

In block B9 and block B12 of FIG. 6, the continuously variable transmission control means 132 converts a target thrust force into a target pulley pressure, for example. Specifically, the continuously variable transmission control means 132 converts the target secondary thrust force Wout* and the target primary thrust force Win* based on the pressure receiving areas of the hydraulic cylinders 46c and 42c into the target secondary pressure Pout* (=Wout*/pressure receiving area of 46c) and the target primary pressure Pin* (=Win*/pressure receiving area of 42c), respectively.

The hydraulic control circuit 100 of this embodiment uses the pressure reducing valves of the primary pressure control valve 110 and the secondary pressure control valve 112 for the control of the primary pressure Pin and the secondary pressure Pout. Therefore, for example, supply and discharge of operating oil during a shift causes a change in spring forces of the springs 110b and 112b and a fluid force (a flow force). As a result, the balance of the forces is lost in the movement direction (the valve opening/closing direction, the up/down direction of FIG. 3) of the spool valve pieces 110a and 112a and, therefore, a gap δP1 is generated between a pulley instruction pressure and an actual pulley pressure. The gap δP1 can be derived from the Bernoulli's theorem and the low of conservation of momentum, for example, and can be expressed by a function of a flow quantity Qf of the operating oil or a change amount of pulley positions Xin and Xout as override characteristics. The hydraulic control circuit 100 of this embodiment is disposed with the orifices 120 and 124. Therefore, a pressure difference δP2 is generated during a shift between the upper streams and the lower streams of the orifices 120 and 124 depending on the flow quantity Qf of the operating oil. The pressure difference δP2 can be expressed by a quadratic function of the flow quantity Qf of the operating oil or a change amount of the pulley positions Xin and Xout as orifice characteristics, for example.

Lag characteristics of the hydraulic control circuit 100 and lag characteristic of fluid exist in a change in actual pulley pressure relative to a change in pulley instruction pressure. The lag characteristics can be approximated by a first-order lag system or a second-order lag system, for example. Therefore, the lag characteristics of the actual pulley pressure relative to the pulley instruction pressure are modeled, and lag compensation characteristics for canceling the lag characteristics are modeled based on the modeled lag characteristics.

In blocks B10, B11 and blocks B13, B14 of FIG. 6, the continuously variable transmission control means 132 sets, as the secondary instruction pressure Pouttgt and the primary instruction pressure Pintgt, values acquired as the target secondary pressure Pout* and the target primary pressure Pin* corrected by a gap amount (δP1+δP2) based on the override characteristics and the orifice characteristics and compensated by an oil pressure response lag based on the modeled lag compensation characteristics, for example.

The continuously variable transmission control means 132 outputs the primary instruction pressure Pintgt and the secondary instruction pressure Pouttgt as a hydraulic control command signal $S_{CVT}$ to the hydraulic control circuit 100 so as to acquire the target primary pressure Pin* and the target secondary pressure Pout*, for example. The hydraulic control circuit 100 actuates the linear solenoid valve SLP to adjust the primary pressure Pin and actuates the linear solenoid valve SLS to adjust the secondary pressure Pout in accordance with the hydraulic control command signal $S_{CVT}$.

For example, to compensate the oil pressure variation (variation in hydraulic control) on the side of secondary pulley 46, the continuously variable transmission control means 132 corrects the secondary instruction pressure Pouttgt through feedback control based on a deviation ΔPout (=Pout*−Pout detection value) between a detection value of the secondary pressure Pout and the target secondary pressure Pout* so that the detection value of the secondary pressure Pout from the secondary pressure sensor 78 matches the target secondary pressure Pout*. Since no oil pressure sensor is disposed on the side of the primary pulley 42, the hydraulic control circuit 100 of this embodiment cannot correct the primary instruction pressure Pintgt through feedback control as in the case of the side of the secondary pulley 46 based on a deviation between a detection value and an actual value of a pulley pressure. However, in this embodiment, for example, a value (=Winsh+Winfb) corrected through feedback control for matching the actual gear ratio γ to the target gear ratio γ* in block B8 is set as the target primary thrust force Win* and, therefore, the oil pressure variation on the side of the primary pulley 42 can be compensated.

FIG. 12 is a flowchart for explaining a main portion of the control operation of the electronic control device 50, i.e., the control operation for achieving fuel efficiency improvement by cutting an oil pressure margin (an oil pressure for compensating oil pressure variation) on the side of the primary pulley 42 with lower hydraulic control accuracy and is repeatedly executed with an extremely short cycle time, for example, on the order of few msec to a few tens of msec.

In FIG. 12, first, at step (hereinafter, step will be omitted) S10 corresponding to the limitation thrust force calculating means 134, the secondary-pulley-side slip limitation thrust force Woutlmt is calculated from, for example, Equation (1) based on the input torque $T_{IN}$ of the continuously variable transmission 18, the sheave angle α of the variable pulleys 42 and 46, the predetermined element-pulley friction coefficient gout on the side of the secondary pulley 46, and the belt winding diameter Rin on the side of the primary pulley 42 uniquely calculated from the actual gear ratio γ. At S20 corresponding to the limitation thrust force calculating means 134, the primary-pulley-side slip limitation thrust force Winlmt is calculated from, for example, Equation (2) based on the input torque $T_{IN}$ of the continuously variable transmission 18, the sheave angle α of the variable pulleys 42 and 46, the predetermined element-pulley friction coefficient μin on the side of the primary pulley 42, and the belt winding diameter Rin on the side of the primary pulley 42 uniquely calculated from the actual gear ratio γ. At S20, for example, if consideration is given to the variation to physical characteristics, the control margin Wmgn may be added to the primary-pulley-side slip limitation thrust force Winlmt. At S30 corresponding to the steady thrust force calculating means 136, the thrust force ratio τin is calculated from, for example, the thrust force ratio map as depicted in FIG. 10(a) based on the sequentially calculated target gear ratio γ* and the inverse $SFin^{-1}$ of the primary-side safety rate. The secondary balance thrust force (secondary steady thrust force) Woutbl is then calculated based on the primary-pulley-side slip limitation thrust force Winlmt and the thrust force ratio Tin from Equation (3). If the control margin Wmgn is added to the primary-pulley-side slip limitation thrust force Winlmt at S20, the secondary balance thrust force Woutbl is calculated at S30 from Equation (3)' instead of Equation (3). At S40 corresponding to the shifting thrust force calculating means 138, the secondary shifting thrust force ΔWout is calculated from, for example, the shifting thrust force map as depicted in FIG. 11(b) based on the sequentially calculated secondary-side target shift speed (dXout/dNelmout). At S50 corresponding to the continuously variable transmission control means 132, the secondary-pulley-side shift control thrust force Woutsh (=Woutbl+ΔWout) is calculated by adding the secondary shifting thrust force ΔWout to the secondary balance thrust force Woutbl, for example. A larger one of the secondary-pulley-side slip limitation thrust force Woutlmt and the secondary-pulley-side shift control thrust force Woutsh is selected as the target secondary thrust force Wout*. S10 to S50 correspond to the secondary-side target thrust force calculating means 150.

At S60 corresponding to the steady thrust force calculating means 136, the thrust force ratio τout is calculated from, for example, the thrust force ratio map as depicted in FIG. 10(b) based on the sequentially calculated target gear ratio γ* and the inverse $SFout^{-1}$ of the secondary-side safety rate. The primary balance thrust force (primary steady thrust force) Winbl is then calculated based on the target secondary thrust force Wout* and the thrust force ratio τout from Equation (4). At S70 corresponding to the shifting thrust force calculating means 138, the primary shifting thrust force ΔWin is calculated from, for example, the shifting thrust force map as depicted in FIG. 11(a) based on the sequentially calculated primary-side target shift speed (dXin/dNelmin). At S80 corresponding to the FB control amount calculating means 140, the feedback control amount (FB control correction amount) Winfb is calculated based on the gear ratio deviation Δγ from a predetermined feedback control equation as described by Equation (5), for example. At S90 corresponding to the continuously variable transmission control means 132, the primary-pulley-side shift control thrust force Winsh (=Winbl+ΔWin) is calculated by adding the primary shifting thrust force ΔWin to the primary balance thrust force Winbl, for example. The target primary thrust force Win* (=Winsh+Winfb) is set by adding the feedback control amount Winfb to the primary-pulley-side shift control thrust force Winsh. S60 to S90 correspond to the primary-side target thrust force calculating means 152.

At S100 corresponding to the continuously variable transmission control means 132, for example, the target secondary thrust force Wout* is converted into the target secondary pressure Pout* (=Wout*/pressure receiving area) based on the pressure receiving area of the secondary-side hydraulic cylinder 46c. The target secondary pressure Pout* is corrected by a gap amount (δP1+δP2) based on the override characteristics and the orifice characteristics and compensated by an oil pressure response lag based on the modeled lag compensation characteristics so as to set an acquired value as the secondary instruction pressure Pouttgt. The secondary instruction pressure Pouttgt is output as the hydraulic control command signal $S_{CVT}$ to the hydraulic control circuit 100, and the linear solenoid valve SLS is actuated to adjust the secondary pressure Pout in accordance with the hydraulic control command signal $S_{CVT}$. In this case, for example, the secondary instruction pressure Pouttgt is corrected through feedback control based on the deviation ΔPout (=Pout*−Pout detection value) so that the detection value of the secondary pressure Pout from the secondary pressure sensor 78 matches the target secondary pressure Pout*, and the oil pressure variation on the side of the secondary pulley 46 is compensated.

At S110 corresponding to the continuously variable transmission control means 132, for example, the target primary thrust force Win* is converted into the target primary pressure Pin* (=Win*/pressure receiving area) based on the pressure receiving area of the primary-side hydraulic cylinder 42c. The target primary pressure Pin* is corrected by a gap amount (δP1+δP2) based on the override characteristics and the orifice characteristics and compensated by an oil pressure response lag based on the modeled lag compensation characteristics so as to set an acquired value as the primary instruction pressure Pintgt. The primary instruction pressure Pintgt is output as the hydraulic control command signal $S_{CVT}$ to the hydraulic control circuit 100, and the linear solenoid valve SLP is actuated to adjust the primary pressure Pin in accordance with the hydraulic control command signal $S_{CVT}$. In this case, for example, a value (=Winsh+Winfb) corrected through feedback control for matching the actual gear ratio γ to the target gear ratio γ* at S80 and S90 is set as the target primary thrust force Win* and, therefore, the oil pressure variation on the side of the primary pulley 42 is compensated.

As described above, according to the embodiment, since a larger one is selected as the target secondary thrust force Wout* out of the secondary-pulley-side slip limitation thrust force Woutlmt and the secondary-pulley-side shift control thrust force Woutsh on the side of the secondary pulley 46 required for shift control calculated based on a primary-pulley-side slip limitation thrust force Winlmt, a required thrust force for the belt slip prevention in the secondary pulley 46 is naturally ensured on the side of the secondary pulley 46 with relatively higher thrust force control accuracy (hydraulic control accuracy) and a required thrust force for the belt slip prevention is also ensured in the primary pulley 42 with relatively lower thrust force control accuracy. Since the thrust force for the belt slip prevention is controlled on the side of the secondary pulley 46 with relatively higher thrust force control accuracy, it is not necessary to add the oil pressure variation in the primary pulley 42 with relatively lower thrust force control accuracy at the time of setting of the target secondary thrust force Wout*. In other words, the required thrust forces for the belt slip prevention in the both variable pulleys 42 and 46 are ensured without adding the oil pressure variation on the side of the secondary pulley 46. Therefore, improvement in fuel efficiency can be achieved by cutting an oil pressure margin on the side of the primary pulley 42 with relatively lower hydraulic control accuracy. The thrust force control accuracy (hydraulic control accuracy) is made higher only on the side of the secondary pulley 46 and, therefore, a cost increase is suppressed.

According to this embodiment, since the primary-pulley-side shift control thrust force Winsh required for shift control calculated based on the target secondary thrust force Wout* is set as the target primary thrust force Win*, an intended shift can be achieved while a belt slip in the primary pulley 42 is prevented without adding the oil pressure variation in the primary pulley 42 with relatively lower thrust force control accuracy, for example.

According to this embodiment, the target primary thrust force Win* is corrected through feedback control of the primary thrust force Win based on the gear ratio deviation Δγ between the target gear ratio γ* and the actual gear ratio γ or the deviation ΔXin between the target pulley position Xin* and the actual pulley position Xin and, thus, the oil pressure variation can be compensated in the primary pulley 42 with relatively lower thrust force control accuracy, for example. Therefore, deterioration of fuel efficiency due to the oil pressure variation can be suppressed and the intended shift and the belt slip prevention can properly be implemented with a required minimum pulley thrust force.

According to this embodiment, the thrust force required for the shift control (the secondary-pulley-side shift control thrust force Woutsh, the primary-pulley-side shift control thrust force Winsh) is a thrust force required for achieving the target gear ratio γ* and the target shift speed (the primary-side target shift speed (dXin/dNelmin), the secondary-side target shift speed (dXout/dNelmout)) and, therefore, for example, a thrust force required for the shift control is properly calculated.

According to this embodiment, since the slip limitation thrust force Wlmt is calculated based on the actual gear ratio γ and the input torque $T_{IN}$ of the continuously variable transmission 18, for example, the slip limitation thrust force Wlmt is properly calculated and a required thrust force for the belt slip prevention is properly ensured.

According to this embodiment, since the hydraulic control circuit 100 includes the secondary pressure sensor 78 for detecting the actual secondary pressure Pout acting on the secondary pulley 46 only on the side of the secondary pulley 46 and provides the feedback control of matching a detection value of the secondary pressure sensor 78 to the target secondary pressure Pout* corresponding to the target secondary thrust force Wout*, a thrust force (a pulley pressure) can accurately be controlled, for example, on the side of the secondary pulley 46 as compared to the side of the primary pulley 42 without an oil pressure sensor.

According to this embodiment, since a predetermined thrust force (control margin) Wmgn corresponds to variation to physical characteristics related to the calculation of a thrust force on the side of the secondary pulley 46 (the secondary balance thrust force Woutbl and the secondary shifting thrust force ΔWout) based on the primary-pulley-side slip limitation thrust force Winlmt and is added to the primary-pulley-side slip limitation thrust force Winlmt before the calculation of the thrust force on the side of the secondary pulley 46, a required thrust force is properly ensured for certainly preventing a belt slip in the primary pulley 42 with relatively lower thrust force control accuracy, for example.

Although the embodiment of the present invention has been described in detail with reference to the drawings, the present invention is applied in other forms.

For example, although the hydraulic control circuit 100 is included that can accurately control the secondary pulley 46 in terms of thrust force (pulley pressure) as compared to the primary pulley 42 in the embodiment, this is not a limitation and, for example, the hydraulic control circuit 100 may be included that can accurately control the side of the primary pulley 42 in terms of thrust force as compared to the side of the secondary pulley 46. In this case, the slip limitation thrust force on the side of the primary pulley 42 and the slip limitation thrust force on the side of the secondary pulley 46 are ensured, i.e., the belt torque capacities of the both pulleys 42 and 46 are assured on the side of the primary pulley 42, for example. On the side of the secondary pulley 46 with relatively lower hydraulic control accuracy, the target secondary thrust force Wout* corresponding to the target primary thrust force Win* is set to achieve an intended shift. In this case, the feedback control based on the gear ratio deviation Δγ is provided so as to avoid fuel efficiency deterioration due to oil pressure variation on the side of the secondary pulley 46. Therefore, in short, the present invention may be applicable as long as the hydraulic control circuit 100 is included that can accurately control one pulley of the primary pulley 42 and the secondary pulley 46 in terms of thrust force as compared to the other pulley.

Although the thrust force (pulley pressure) can accurately be controlled by including an oil pressure sensor capable of detecting a pulley pressure as compared to the pulley side without the oil pressure sensor in the embodiment, this is not necessarily a limitation. For example, an oil pressure sensor may not be disposed if oil pressure variation is suppressed in hardware making up the hydraulic control circuit 100, such as the linear solenoid valve SL, and the hydraulic control accuracy is relatively high.

Although the embodiment uses the torque converter 14 including the lockup clutch 26 as a hydraulic transmission device, the lockup clutch 26 may not necessarily be included and another hydraulic power transmission device such as a fluid coupling (fluid coupling) without a torque amplification effect may be used instead of the torque converter 14. If a forward/reverse switching device acts as a starting mechanism, if a starting mechanism such as a starting clutch is included, or if an engagement device etc., are included that can interrupt/connect a power transmission path, a hydraulic power transmission device may not be included.

The described embodiment is merely an exemplary embodiment and the present invention may be implemented in variously modified and improved forms based on the knowledge of those skilled in the art.

Nomenclature Of Elements
  18: belt type continuously variable transmission (continuously variable transmission for a vehicle)
  42: input-side variable pulley
  46: output-side variable pulley
  48: transmission belt
  50: electronic control device (control device)
  78: secondary pressure sensor (oil pressure sensor)
  100: hydraulic control circuit

The invention claimed is:

1. A control device of a continuously variable transmission for a vehicle having a pair of variable pulleys with variable effective diameters of an input-side variable pulley and an output-side variable pulley and a transmission belt wound around between the pair of the variable pulleys, the continuously variable transmission respectively controlling an input-side thrust force in the input-side variable pulley and an output-side thrust force in the output-side variable pulley to set an actual gear ratio to a target gear ratio while preventing a slip of the transmission belt, the continuously variable transmission comprising:
  a hydraulic control circuit capable of accurately controlling one of the input-side variable pulley and the output-side variable pulley in terms of thrust force as compared to the other,
  in the case that a target thrust force on the one side for assuring belt slip prevention of the both pulleys on the one side is set, based on a target thrust force on the one side, a target thrust force on the other side for achieving a target gear ratio on the other side being set, and a larger one being selected as the target thrust force on the one side out of
  a limit thrust force to a slip on the one side required for belt slip prevention on the one side, and
  a thrust force on the one side required for achieving a target gear ratio on the one side calculated based on a limit thrust force to a slip on the other side required for belt slip prevention on the other side.

2. The control device of a continuously variable transmission for a vehicle of claim 1, wherein the target thrust force on the other side is corrected through feedback control of a thrust force on the other side based on a deviation between a target gear ratio and an actual gear ratio or a deviation between a target pulley position and an actual pulley position.

3. The control device of a continuously variable transmission for a vehicle of claim 2, wherein the thrust force required for the shift control is a thrust force required for achieving a target gear ratio and a target shift speed.

4. The control device of a continuously variable transmission for a vehicle of claim 3, wherein the limit thrust force to a slip is calculated based on an actual gear ratio and an input torque of the continuously variable transmission for a vehicle.

5. The control device of a continuously variable transmission for a vehicle of claim 2, wherein the limit thrust force to a slip is calculated based on an actual gear ratio and an input torque of the continuously variable transmission for a vehicle.

6. The control device of a continuously variable transmission for a vehicle of claim 2, wherein
  the hydraulic control circuit includes an oil pressure sensor for detecting an actual pulley pressure acting on the one variable pulley only on the one side, and wherein
  feedback control is provided that sets a detection value of the oil pressure sensor to a target pulley pressure corresponding to the target thrust force on the one side.

7. The control device of a continuously variable transmission for a vehicle of claim 2, wherein a predetermined thrust force corresponding to variation related to calculation of the thrust force on the one side based on the limit thrust force to a slip on the other side is added before the calculation to the limit thrust force to a slip on the other side.

8. The control device of a continuously variable transmission for a vehicle of claim 1, wherein the thrust force required for the shift control is a thrust force required for achieving a target gear ratio and a target shift speed.

9. The control device of a continuously variable transmission for a vehicle of claim 8, wherein the limit thrust force to a slip is calculated based on an actual gear ratio and an input torque of the continuously variable transmission for a vehicle.

10. The control device of a continuously variable transmission for a vehicle of claim 8, wherein
  the hydraulic control circuit includes an oil pressure sensor for detecting an actual pulley pressure acting on the one variable pulley only on the one side, and wherein
  feedback control is provided that sets a detection value of the oil pressure sensor to a target pulley pressure corresponding to the target thrust force on the one side.

11. The control device of a continuously variable transmission for a vehicle of claim 8, wherein a predetermined thrust force corresponding to variation related to calculation of the thrust force on the one side based on the limit thrust force to a slip on the other side is added before the calculation to the limit thrust force to a slip on the other side.

12. The control device of a continuously variable transmission for a vehicle of claim 1, wherein the limit thrust force to a slip is calculated based on an actual gear ratio and an input torque of the continuously variable transmission for a vehicle.

13. The control device of a continuously variable transmission for a vehicle of claim 12, wherein
the hydraulic control circuit includes an oil pressure sensor for detecting an actual pulley pressure acting on the one variable pulley only on the one side, and wherein
feedback control is provided that sets a detection value of the oil pressure sensor to a target pulley pressure corresponding to the target thrust force on the one side.

14. The control device of a continuously variable transmission for a vehicle of claim 12, wherein a predetermined thrust force corresponding to variation related to calculation of the thrust force on the one side based on the limit thrust force to a slip on the other side is added before the calculation to the limit thrust force to a slip on the other side.

15. The control device of a continuously variable transmission for a vehicle of claim 1, wherein
the hydraulic control circuit includes an oil pressure sensor for detecting an actual pulley pressure acting on the one variable pulley only on the one side, and wherein
feedback control is provided that sets a detection value of the oil pressure sensor to a target pulley pressure corresponding to the target thrust force on the one side.

16. The control device of a continuously variable transmission for a vehicle of claim 15, wherein a predetermined thrust force corresponding to variation related to calculation of the thrust force on the one side based on the limit thrust force to a slip on the other side is added before the calculation to the limit thrust force to a slip on the other side.

17. The control device of a continuously variable transmission for a vehicle of claim 1, wherein a predetermined thrust force corresponding to variation related to calculation of the thrust force on the one side based on the limit thrust force to a slip on the other side is added before the calculation to the limit thrust force to a slip on the other side.

* * * * *